(12) United States Patent
Roy et al.

(10) Patent No.: US 9,886,739 B2
(45) Date of Patent: Feb. 6, 2018

(54) RECORDING A COMMAND STREAM WITH A RICH ENCODING FORMAT FOR CAPTURE AND PLAYBACK OF GRAPHICS CONTENT

(71) Applicant: Apple Inc., Cupertino, CA (US)

(72) Inventors: Jean-Francois Roy, San Bruno, CA (US); Filip Iliescu, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/237,358

(22) Filed: Aug. 15, 2016

(65) Prior Publication Data

US 2017/0039673 A1     Feb. 9, 2017

Related U.S. Application Data

(63) Continuation of application No. 14/834,344, filed on Aug. 24, 2015, now Pat. No. 9,417,767, which is a
(Continued)

(51) Int. Cl.
    *G06F 11/34*     (2006.01)
    *G06F 11/36*     (2006.01)
(Continued)

(52) U.S. Cl.
CPC .............. *G06T 1/20* (2013.01); *G06F 3/048* (2013.01); *G06F 3/0482* (2013.01); *G06F 3/14* (2013.01);
(Continued)

(58) Field of Classification Search
None
See application file for complete search history.

(56) References Cited

U.S. PATENT DOCUMENTS 5,764,243 A    6/1998   Baldwin
5,802,017 A    9/1998   Sato et al.
(Continued)

OTHER PUBLICATIONS

"GPU PerfStudio 2.3", AMO Developer Central, Frame Debugger, Launched Sep. 27, 2010, http ://developer. amd .com/g pu/Perf Studio/pages/ AP IT raceWi ndow. aspx, Sep. 27, 2010, 11 pages.
(Continued)

*Primary Examiner* — Joni Richer
(74) *Attorney, Agent, or Firm* — Fish & Richardson P.C.

(57) ABSTRACT

Analyzing an application executing on a target device. An application may be executed on a target device. Low cost measurement may be gathered regarding the application executing on the target device. In response to a trigger, high cost measurement data may be gathered regarding the application executing on the target device. The high cost measurement data may include graphics commands provided by the application. The graphics commands and related information may be stored and provided to a host. The host may modify the graphics commands to perform experiments to determine performance issues of the application executing on the target device. The host may determine whether the performance is limited by the CPU or the GPU and may determine specific operations that are causing performance issues. The host may provide suggestions for overcoming the performance issues.

20 Claims, 16 Drawing Sheets

Related U.S. Application Data continuation of application No. 14/139,467, filed on Dec. 23, 2013, now Pat. No. 9,117,286, which is a continuation of application No. 12/896,097, filed on Oct. 1, 2010, now Pat. No. 8,614,716.

(51) Int. Cl.

| | | |
|---|---|---|
| *G06T 1/20* | (2006.01) | |
| *G06F 9/455* | (2006.01) | |
| *G06F 3/048* | (2013.01) | |
| *G06T 15/00* | (2011.01) | |
| *G06F 3/14* | (2006.01) | |
| *G09G 5/00* | (2006.01) | |
| *G09G 5/36* | (2006.01) | |
| *G06F 3/0482* | (2013.01) | |
| *G09G 5/393* | (2006.01) | |
| *G06T 15/04* | (2011.01) | |
| *G06T 15/80* | (2011.01) | |

(52) U.S. Cl.
CPC ...... *G06F 9/45516* (2013.01); *G06F 11/3457* (2013.01); *G06F 11/3466* (2013.01); *G06F 11/3612* (2013.01); *G06T 15/005* (2013.01); *G09G 5/001* (2013.01); *G09G 5/363* (2013.01); *G09G 5/393* (2013.01); *G06T 15/04* (2013.01); *G06T 15/80* (2013.01); *G06T 2200/04* (2013.01); *G06T 2200/16* (2013.01); *G06T 2200/24* (2013.01); *G06T 2200/28* (2013.01); *G09G 2360/08* (2013.01)

(56) References Cited

U.S. PATENT DOCUMENTS

| | | | |
|---|---|---|---|
| 6,067,643 A | 5/2000 | Omtzigt | |
| 6,092,097 A | 7/2000 | Suzuoka | |
| 6,301,701 B1 | 10/2001 | Walker | |
| 6,313,838 B1 | 11/2001 | Deering | |
| 6,505,249 B1 | 1/2003 | Rehkopf | |
| 6,657,634 B1 | 12/2003 | Sinclair et al. | |
| 6,661,423 B2 | 12/2003 | Lavelle et al. | |
| 6,717,577 B1 | 4/2004 | Cheng et al. | |
| 6,938,176 B1 | 8/2005 | Alben et al. | |
| 7,027,972 B1* | 4/2006 | Lee | G06F 11/3457 703/22 |
| 7,058,953 B2 | 6/2006 | Willard et al. | |
| 7,095,416 B1* | 8/2006 | Johns | A63F 13/10 345/522 |
| 7,196,710 B1 | 3/2007 | Fouladi et al. | |
| 7,197,669 B2 | 3/2007 | Kong et al. | |
| 7,451,332 B2 | 11/2008 | Culbert et al. | |
| 7,453,465 B2 | 11/2008 | Schmieder et al. | |
| 7,487,371 B2 | 2/2009 | Simeral et al. | |
| 7,545,373 B2 | 6/2009 | Knighton | |
| 7,548,238 B2 | 6/2009 | Berteig et al. | |
| 7,555,549 B1 | 6/2009 | Campbell | |
| 7,665,019 B2 | 2/2010 | Jaeger | |
| 7,778,800 B2 | 8/2010 | Aguaviva et al. | |
| 7,782,325 B2 | 8/2010 | Gonzalez et al. | |
| 7,950,003 B1 | 5/2011 | Duca et al. | |
| 8,229,936 B2* | 7/2012 | Brown | G06F 17/30997 707/754 |
| 8,284,207 B2 | 10/2012 | Bakalash et al. | |
| 8,286,143 B2 | 10/2012 | Garimella et al. | |
| 8,448,067 B2 | 5/2013 | Cerny et al. | |
| 8,462,166 B2 | 6/2013 | Sowerby et al. | |
| 8,527,239 B2 | 9/2013 | Sowerby et al. | |
| 8,581,916 B2 | 11/2013 | Cormack | |
| 8,607,151 B2 | 12/2013 | Aguaviva et al. | |
| 8,614,716 B2 | 12/2013 | Roy et al. | |
| 8,676,530 B2 | 3/2014 | Roth et al. | |
| 8,682,053 B2 | 3/2014 | Schneider | |
| 8,933,948 B2 | 1/2015 | Sowerby et al. | |
| 9,117,286 B2 | 8/2015 | Roy et al. | |
| 9,417,767 B2 | 8/2016 | Roy et al. | |
| 2001/0011370 A1 | 8/2001 | Gunter et al. | |
| 2002/0140710 A1 | 10/2002 | Fliflet | |
| 2006/0047649 A1 | 3/2006 | Liang | |
| 2007/0139421 A1 | 6/2007 | Chen et al. | |
| 2007/0240102 A1 | 10/2007 | Bello et al. | |
| 2008/0033696 A1 | 2/2008 | Aguaviva | |
| 2008/0034311 A1 | 2/2008 | Aguaviva et al. | |
| 2008/0049009 A1 | 2/2008 | Khodorkovsky | |
| 2008/0141131 A1 | 6/2008 | Cerny et al. | |
| 2008/0195948 A1 | 8/2008 | Bauer | |
| 2009/0109230 A1 | 4/2009 | Miller et al. | |
| 2009/0309885 A1 | 12/2009 | Samson et al. | |
| 2010/0005341 A1 | 1/2010 | Agarwal | |
| 2010/0020069 A1 | 1/2010 | Elmieh et al. | |
| 2010/0131252 A1 | 5/2010 | Harris | |
| 2011/0063296 A1 | 3/2011 | Bolz et al. | |
| 2012/0081376 A1 | 4/2012 | Sowerby et al. | |
| 2012/0081378 A1 | 4/2012 | Roy et al. | |
| 2012/0102466 A1 | 4/2012 | Bates | |
| 2012/0143588 A1 | 6/2012 | Liu et al. | |
| 2014/0184624 A1 | 7/2014 | Roy et al. | |
| 2014/0186424 A1 | 7/2014 | Roy et al. | |
| 2015/0347282 A1 | 12/2015 | Wingfors et al. | |

OTHER PUBLICATIONS

"Method for greatly increasing the quality and usefulness of automated performance testing results", An IP.com Prior Art Database Technical Disclosure, Jan. 20, 2011, 3 pages.

"NVIDIA—PerfHUD 6 User Guide", DU-01231-001_v09, Nov. 2004-2008, NVIDIA Corporation, 2701 San Tomas Expressway, Santa Clara, CA 95050, http ://developer .down load. nvid ia.co m/tools/NVPerf Kit/6. 5/Perf HU 06-UserGuide.pdf, 37 pages.

"NVIDIA—ShaderPerf 2.0 Quick Tutorial", DU-01231-001_v01, May 2004-2008, NVIDIA Corporation, 2701 San Tomas Expressway, Santa Clara, CA 95050, www.nvidia.com, 10 pages.

"Pix User's Guide", MSDN, 2006; 54 pages; Obtained from Internet: <http://msdn.microsoft.com/en-us/library/ee417207%28v=VS.85%29.aspx>, Dec. 2010.

Keng-Yu Lin; "GPTI: A Cross-Platform Graphics Performance Tuning Tool for Embedded System"; National Sun Vat-sen University; 61 pages, Aug. 22, 2006.

* cited by examiner

FIG. 10D

OpenGL ES Performance Detective

○ Open Case
○ Collect Evidence
● Investigate
○ Identify Suspects

Please do not disturb the iOS device while Performance Detective investigates. This may take a few seconds.

Investigating fragment shaders

Quit

RECORDING A COMMAND STREAM WITH A RICH ENCODING FORMAT FOR CAPTURE AND PLAYBACK OF GRAPHICS CONTENT

CROSS-REFERENCE TO RELATED APPLICATIONS

This application is a continuation of U.S. patent application Ser. No. 14/834,344, filed on Aug. 24, 2015, which is a continuation of U.S. patent application Ser. No. 14/139,467, filed on Dec. 23, 2013, which is a continuation of U.S. patent application Ser. No. 12/896,097, filed on Oct. 1, 2010, the entire contents of each of which are incorporated herein by reference.

FIELD OF THE INVENTION

The present invention relates to the field of computer graphics, and more particularly to performance analysis of graphics applications.

DESCRIPTION OF THE RELATED ART

Many modern devices include high end graphical processing systems for presenting graphics on a display. Due to their complexity, development of graphical software applications for such devices is often difficult. For example, development of software which interacts with the graphical processing system often results in sub-optimal graphical system performance and resource utilization. In order to assist developers in creating graphical software applications, improved tools are desired for detection of performance bottlenecks and opportunities for performance optimization in graphical application development.

SUMMARY OF THE INVENTION

Various embodiments are presented of a system and method for analyzing applications executing on a target device. In particular, embodiments are presented for analyzing the performance of graphics applications (applications which generate graphics for display).

The target device and a host device may be paired together. The host device may execute a development application to perform testing of an application on the target device. The host device may deploy the application to the target device and begin execution of the application on the target device. The host device may also deploy other programs on the target device in order to analyze the execution of the application on the target device. For example, the host device may deploy one or more measurement or monitoring applications which may perform monitoring of the execution of the application while it executes on the target device.

For example, the measurement programs may initially perform low cost measurement of the application while it executes on the target device. The low cost measurement of the application may not substantially impact performance of the application execution. The low cost measurement may provide execution information, such as CPU load (e.g., related to graphics processing or not), GPU load, frame rate, etc.

The target device may include a graphics system which includes both a central processing unit (CPU) and a graphics processing unit (GPU). During execution of the graphics application on the CPU of the target device, the measurement software may measure execution load of the CPU and the GPU of the device and determine whether the CPU is limiting graphics performance of the graphics application. If the CPU is limiting graphics performance of the graphics application, the measurement software may provide an indication to the host computer. The application developer can then use this information to modify the application.

During operation of the low cost measurement, the measurement program may monitor for various conditions (or "triggers") which indicate a performance issue that merits more detailed monitoring. In response to a trigger, high cost measurement may be initiated (e.g., by the measurement application). The high cost measurement involves a more detailed analysis of system performance, which is hence more "costly" or more "intrusive". The high cost measurement may be provided via automatic processes (e.g., a detected drop in frame rate above a threshold amount, increase in GPU load a threshold amount, etc.) or manually (e.g., a user providing input to invoke the trigger).

During high cost measurement, graphics commands provided by the application may be captured and recorded. For example, graphics commands provided from the application to a graphics framework (also executing on the target device) may be intercepted by the measurement application. The measurement application may then store these commands and may also derive additional information regarding the commands or the state of the graphics system of the target device. The additional information may comprise data such as: a timestamp indicating a time when the first graphics command was received or executed; a duration of time for execution of a first graphics command; state information indicating an execution state of the application; a current graphics framework error at the time of receiving a respective graphics command; a flag indicating that the first graphics command should not be executed on later playback of the plurality of graphics commands; and/or a graphics command that is not provided by the graphics application, among numerous others. The additional information may be used in conjunction with the recorded command stream for later playback of the commands or for analysis, as desired. The measurement application may also store related graphics information (e.g., textures referenced by the graphics commands).

After completion of the high cost measurement, a command stream as well as additional information may be stored by the host device. In one embodiment, the command stream may be aggregated by the host device in response to provision of the commands, additional data, and associated graphics data by the target device.

The host device may generate one or more modifications to the command stream in order to determine performance issues or bottlenecks of the application that were present during the high cost measurement. For example, the modifications may disable or simplify various portions of the graphics pipeline or individual operations in order to determine a cause of a performance issue. In some embodiments, the modifications may comprise a modification to one or more of a shader, resource, or graphics state during execution of the modified command stream.

The modifications may be used to generate one or more modified command streams (e.g., by the host or the target device), which may then be executed by the target device. The modified command stream(s) may be executed by a player application that may be deployed on the target device. The player application may be configured to execute the various modified command streams. The target device may monitor execution of the various modified command streams in order to gather performance information of that respective modified command stream.

Accordingly, the various modifications to the command stream may be executed and performance data may be gathered for each execution of the modified command stream. The performance data may be analyzed to identify performance issues of the application executing on the target device. Stated another way, the host may "try out" different modifications to the recorded command stream to attempt to isolate respective portions of the application software that are causing bottlenecks or performance issues when run on the target device. Once the performance issues are identified, one or more suggestions may be provided (e.g., to the developer using the development program) to overcome or address these performance issues.

BRIEF DESCRIPTION OF THE DRAWINGS

A better understanding of the present invention can be obtained when the following detailed description of the preferred embodiment is considered in conjunction with the following drawings, in which:

FIGS. 10A-10E are exemplary GUIs for an analysis program, according to embodiments described herein.

Figure 1A:
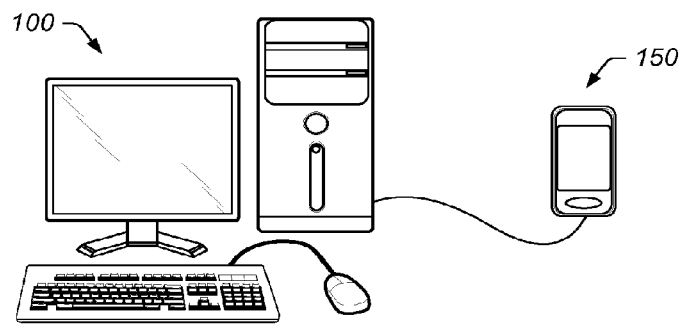
FIGS. 1A-1E illustrate various systems for implementing various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIGS. 1A-1E—Exemplary Systems

FIG. 1A illustrates a computer system 100 (host) that is coupled to a target device 150. The host computer system 100 may be any of various computer systems. The target device 150 may also be any of various computer systems. In some embodiments, the target device 150 may be a portable or mobile device, such as a mobile phone, PDA, audio/video player, etc. In embodiments described herein, the computer system 100 may be configured to act as a host device, which may manage execution of an application (e.g., a graphics application) on the target device 150, e.g., for application development and/or performance analysis, as described herein.

As shown in FIG. 1A, the computer system 100 may include a display device configured to display a graphical user interface (GUI), e.g., of a control or development application executing on the computer system 100. The graphical user interface may include any type of graphical user interface, e.g., depending on the computing platform. The computer system 100 may include at least one memory medium on which one or more computer programs or software components according to one embodiment of the present invention may be stored. For example, the memory medium may store the control application, e.g., which may be executable to perform at least a portion of the methods described herein. Additionally, the memory medium may store a programming development environment application (or developer's tools application) used to create applications, e.g., for execution by the target device 150. The memory medium may also store operating system software, as well as other software for operation of the computer system. Various embodiments further include receiving or storing instructions and/or data implemented in accordance with the foregoing description upon a carrier medium.

As also shown in FIG. 1A, the target device 150 may include a display, which may be operable to display graphics provided by an application executing on the target device 150. The application may be any of various applications, such as, for example, games, internet browsing applications, email applications, phone applications, productivity applications, etc. The application may be stored in a memory medium of the target device 150. The target device 150 may include a central processing unit (CPU) and a graphics processing unit (GPU) which may collectively execute the application. For example, the CPU may generally execute the application as well as a graphics framework (e.g., OpenGL, DirectX, etc.) and graphics driver which may handle any graphics calls or commands that are provided by the application during execution. The graphics driver may in turn provide GPU commands to the GPU, which may execute these commands to provide display capabilities for the application. As used herein, a "graphics application" refers to an application which provides graphics commands for displaying graphics of the application on a display. In other words, the term "graphics application" refers to a software application that, when executed, causes the display of various graphics on a display.

The memory medium of the target device 150 may also store one or more programs for implementing embodiments described herein. For example, the memory medium of the target device 150 may store a program for capturing and encoding graphics commands received from the application. The memory medium of the target device 150 may also store a program for playing back a stream of graphics commands, e.g., which may be provided from the computer system 100. Further, the memory medium of the target device 150 may store a program for performing measuring or monitoring (e.g., at different levels of detail) of the application when it is executing on the target device 150. In further embodiments, the programs may be stored on the computer system 100 and may be read onto the target device 150 for execution.

Figure 1B:
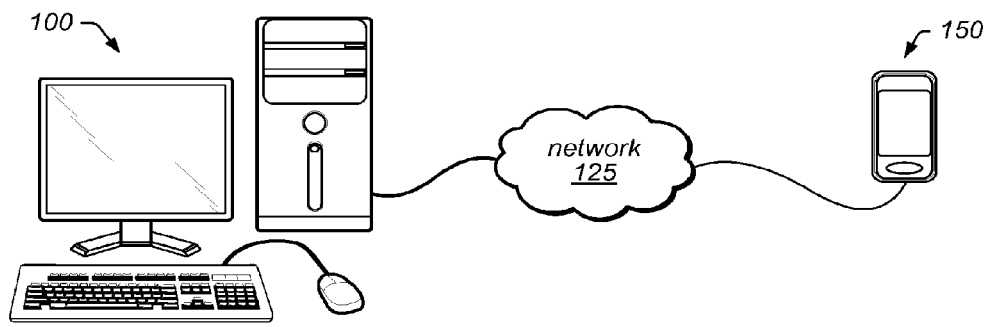

FIG. 1B illustrates a system including the computer system 100 that is coupled to the target device 150 over a network 125. The network 125 can be any of various types, including a LAN (local area network), WAN (wide area network), the Internet, or an Intranet, among others. In general, the computer system 100 and the target device 150 may be coupled in any of various manners, such as wired (e.g., over a serial bus, such as USB, Ethernet, Internet, etc.) or wireless (e.g., WLAN, Bluetooth, IR, etc.).

Figure 1C:
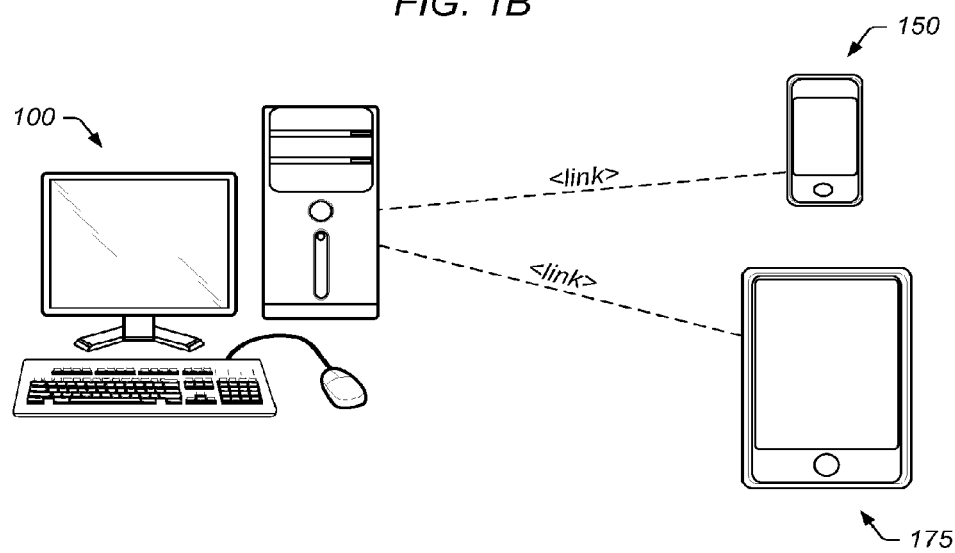

FIG. 1C illustrates a system where the host computer system 100 is coupled to the target device 150 as well as another target device 175. As shown, the target device 175 may be a different type of target device than the target device 150. In one embodiment, the application may be executed on both of the target device 150 and 175. For example, graphics commands captured on the target device 150 may be modified for testing and executed on one or both of the target devices 150 and 175. Accordingly, testing results and/or suggestions may be provided that are generic and/or specific to a particular target device. Thus, the results and/or testing may vary among different types of target devices. Further details regarding testing and capturing graphics commands are provided below.

Figure 1D:
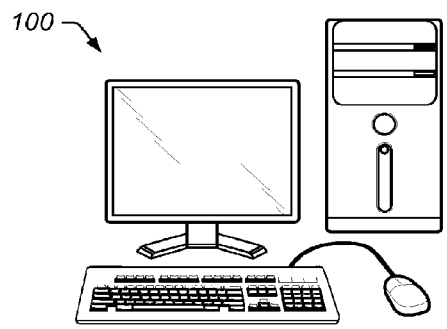
Figure 1E:
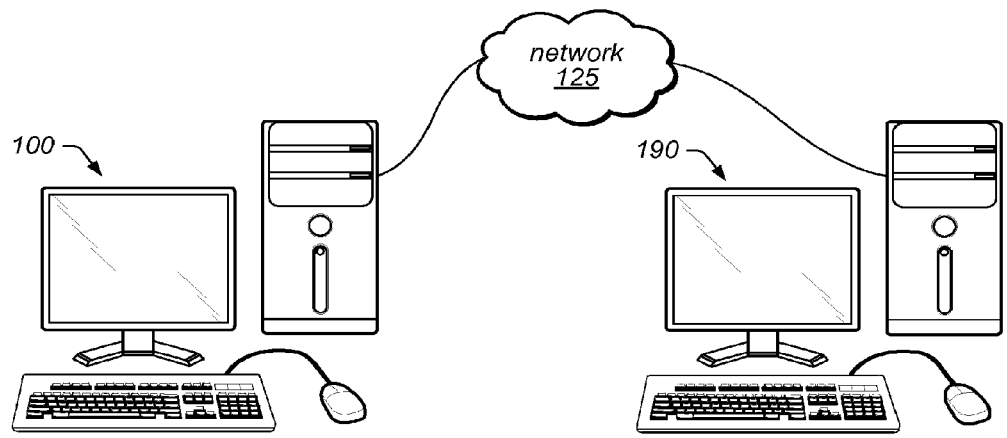

FIGS. 1D and 1E illustrate systems where a computer system may be the target device. In FIG. 1D, the computer system 100 may be the target device as well as the host device. In this embodiment, the computer system 100 may execute both the target application and the control program, thus effectively operating as both the host and target device. Alternatively, in FIG. 1E, a different computer system 190 may be the target device. The two computer systems 100 and 190 may be coupled over the network 125 as shown, or may be coupled directly, as desired.

Figure 2A:
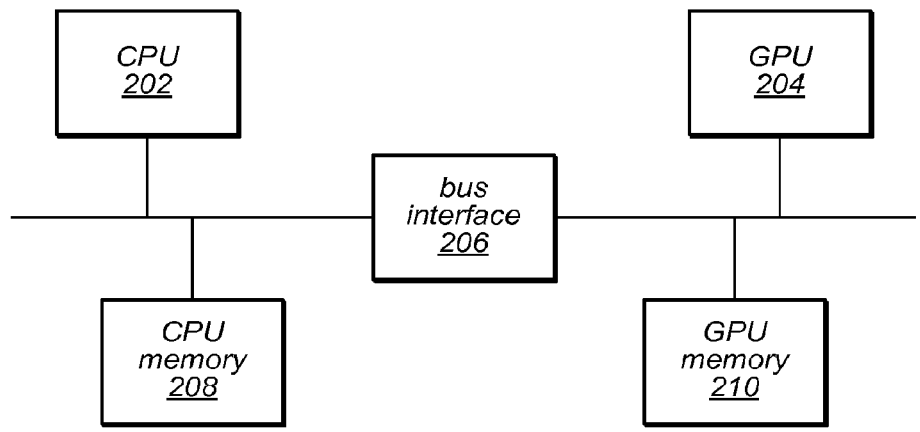
FIGS. 2A and 2B are block diagrams of a system including a CPU and a GPU, according to some embodiments.
Figure 2B:
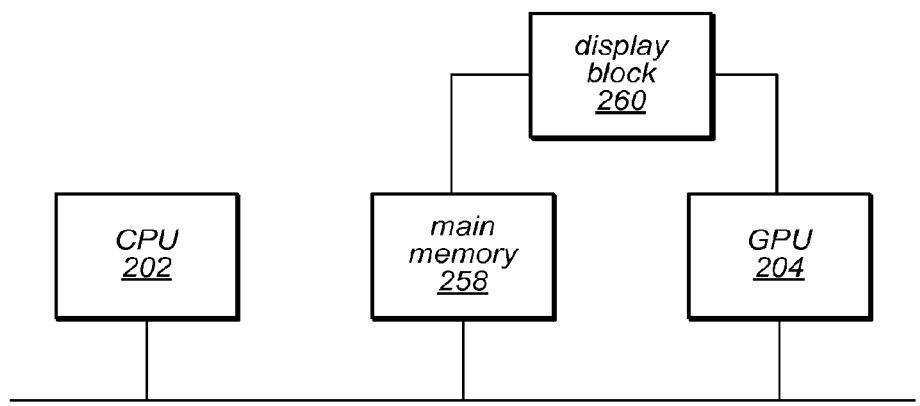

FIGS. 2A-2B—Exemplary Block Diagrams of Graphics System Hardware

FIGS. 2A and 2B are block diagrams of embodiments of target device hardware implementing a graphics system. It is noted that FIGS. 2A and 2B are simplified block diagrams, wherein various components that would normally be present, but which are not necessary for an understanding of the invention, are omitted for simplicity and clarity.

More specifically, FIG. 2A illustrates one embodiment of a hardware architecture of a target device computer system such as 150, 175, 100 or 190. As shown, the CPU 202 and CPU memory 208 may be coupled together (e.g., over a system bus) and GPU 204 and GPU memory 210 may also be coupled together. The CPU 202 and GPU 204 (and their corresponding memories) may be coupled via bus interface 206. For example, in one embodiment, the GPU 204 and GPU memory 210 may be implemented as a video system having a different system interface than the CPU 202 and CPU memory 208. For example, the GPU 204 and GPU memory 210 may be implemented as a video card that is plugged in to a slot of the computer system 100 or 190. The video card may be implemented as a PCI, PCIe, AGP, etc. card. Accordingly, bus interface 206 may interface with the system bus of the CPU 202 and the bus of the video card.

The target device, 150, 175, 100 or 190 would also include display logic (not shown) as well as various other logic.

FIG. 2B illustrates an alternative embodiment of a hardware architecture that may be implemented by target device 150 or 175. In this architecture, the CPU 202 and GPU 204 may be coupled over a system bus and may share a common or unified memory 258 (although separate memories are envisioned). Additionally, a display block 260 may be coupled to memory 258 and GPU 204 for displaying various images on the display of the target device 150 and 175. This implementation may apply to devices whose internal hardware are all or mostly provided within a single integrated chip, e.g., as a system on a chip (SOC).

It should be noted that the above hardware architectures of the graphics system are exemplary and are provided for illustration purposes only. Thus, various modifications (e.g., of blocks or connectivity) resulting in different hardware architectures are envisioned.

Figure 3:
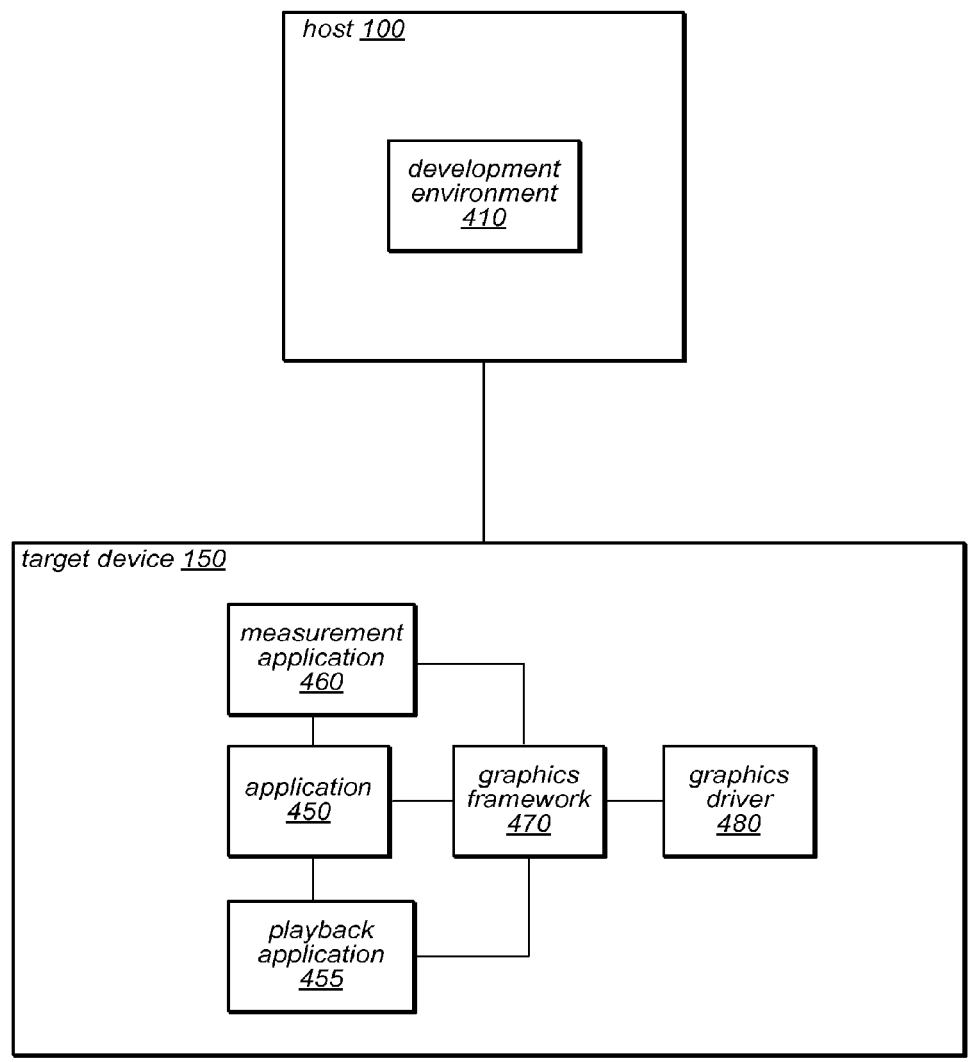
FIG. 3 is a block diagram of software executing on a host device and a target device, according to one embodiment.

FIG. 3—Exemplary Block Diagram of Software Architecture

FIG. 3 is a block diagram of one embodiment of a software architecture that may implement various embodiments described herein.

As shown in FIG. 3, the host 100 may execute a development environment or control application 410. The development environment 410 may be used to develop applications for execution on the target device 150. The development environment 410 may also control execution of a developed application 450, a playback application 455, a measurement application 460, etc. that may be executing on the target device 150.

As also shown in FIG. 3, the target device 150 may execute a variety of programs, including application 450, measurement application 460, playback application 455, graphics framework 470, and graphics driver 480. While this diagram largely shows programs that are executed by the CPU of the target device 150, note that the GPU of the target device 150 may also execute programs, e.g., shaders, that may be provided by the application 450.

In more detail, the application (or graphics application) 450 may be an application that is under development or testing, e.g., within the development environment 410. For example, a developer may be developing the application on the host 100 for ultimate deployment and execution on the target device, and may periodically need to test or debug the application while it is executing on the target device 150. Correspondingly, the development environment 410 may be used to deploy the application to the target device 150 for execution and testing.

The development environment 410 may also deploy other software to the target device 150 to assist in developing the application 450, e.g., once the developer has designated that the target device 150 is used for development of the application 450. For example, the development environment 410 may deploy the measurement application 460 which may measure (or monitor) the execution of the application 450 on the target device 150. In some embodiments, as described below, the measurement application 460 may be operable to measure (or monitor) at a first level of detail (e.g., a first level of intrusion or cost) and at a second higher level of detail (e.g., at a second higher level of intrusion or cost). For example, measuring at the first level of cost may provide fewer details than the second level of cost, but may not impact performance of the execution of the application 450. On the other hand, measuring at the second level of cost may garner more detailed information regarding the execution of the application 450 (e.g., the graphics performance of the application 450), but may impact the performance of the execution of the application 450.

As described below, when the measurement application 460 operates in the second level of cost, it may intercept and record graphics commands provided by the application 450 to the graphics framework 470, as shown (referred to as "graphics framework commands"). However, in alternate embodiments, the measurement application 460 may be configured to intercept and record commands at other times, e.g., between the graphics framework 470 and the graphics driver 480 (referred to as "graphics driver commands") or even commands from the graphics driver 480 to the GPU 204 (referred to as "GPU commands"), as desired. Further, in one embodiment, rather than being coupled to both origin and destination programs in the manner shown, the measurement application 460 may be interposed between the origin and destination programs (or blocks).

These intercepted commands may be encoded as a command stream which may be used for further testing and analysis, as described below. For example, the development environment 410 may deploy the playback application 455 to the target device 150, which may be configured to play back the intercepted (recorded) graphics commands, e.g., to the graphics framework 470 as shown, or to other blocks, depending on where the commands were originally intercepted. As discussed further below, the playback application 455 may be configured to play back various modified versions of the recorded graphics commands to "try out" various possibilities for improving application execution performance. Note that the playback application 455 and the measurement application 460 may be the same application.

The graphics framework 470 may be any of various types of graphics frameworks, e.g., various versions of openGL (including openGL for embedded systems (ES)), DirectX, etc. The graphics framework 470 may receive API calls from the application 450 for performing graphics framework functions. In turn, the graphics framework 470 may provide commands to the graphics driver 480, which may also be executing on the target device 150. Finally, the graphics driver 480 may provide GPU commands to the GPU. The CPU executing the graphics framework 470 and the graphics driver 480, along with the GPU may form a graphics pipeline, such as those embodiments described in FIGS. 4A and 4B below.

Note that the above software architecture is exemplary only and other variations and modifications are envisioned. For example, in some embodiments, the graphics framework 470 may not be necessary and/or may be implemented as part of the application 450 rather than being a separate executable.

Figure 4A:
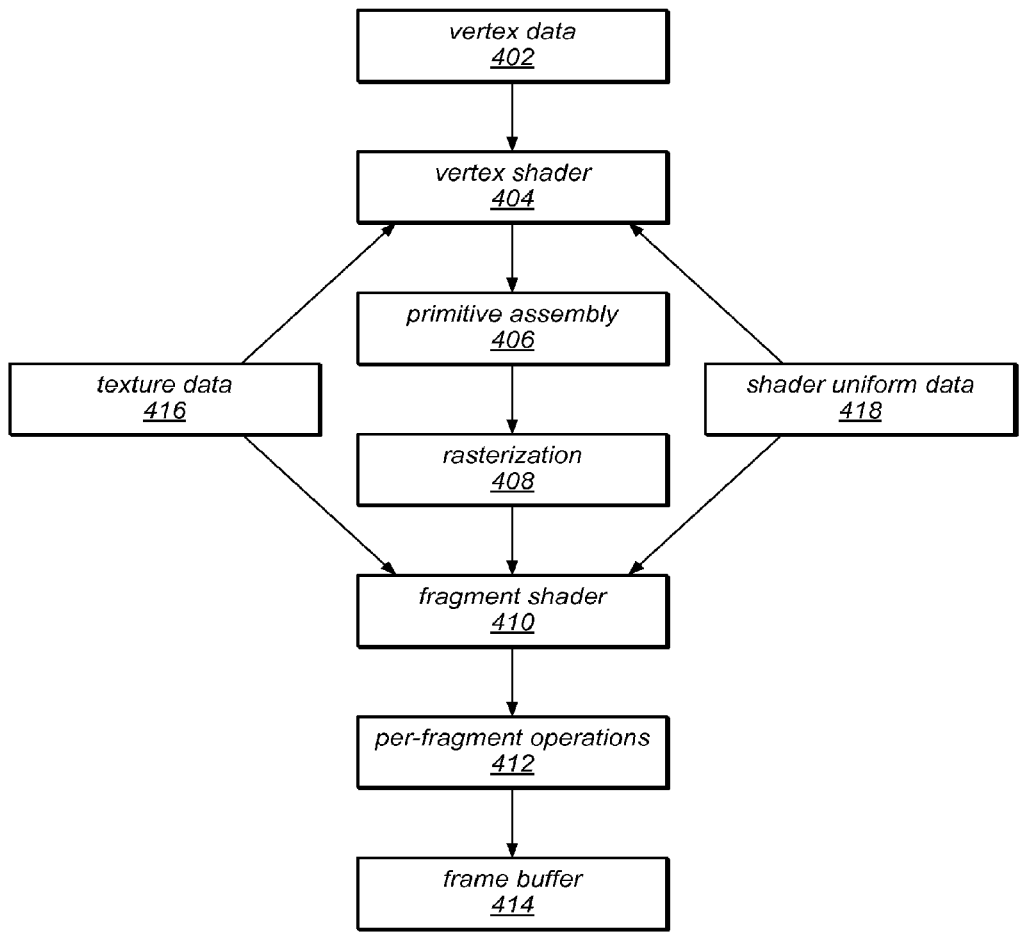
FIGS. 4A-B are exemplary block diagrams illustrating embodiments of a graphics pipeline.
Figure 4B:
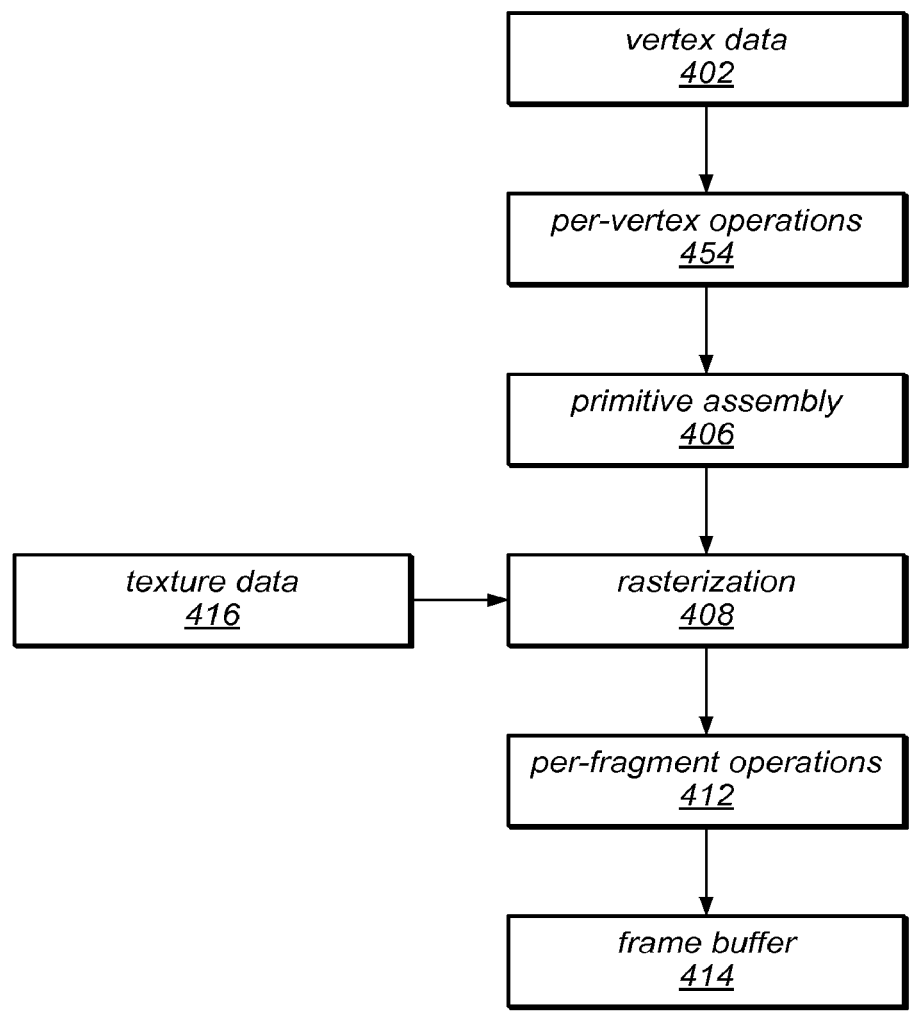

FIGS. 4A and 4B—Exemplary Graphics Pipeline

FIGS. 4A and 4B illustrate exemplary graphics pipelines. More particularly, FIG. 4A illustrates an OpenGL embedded system (ES) 2.0 pipeline and FIG. 4B illustrates an OpenGL embedded systems (ES) 1.1 pipeline, e.g., which may be suitable for a target device 150, such as a mobile device. However, the pipelines of FIGS. 4A and 4B may also be implemented on a computer system such as computer system 100, e.g., with further modifications. For example, a typical OpenGL pipeline may be used for the computer system 100 (rather than an ES pipeline). The pipelines of FIGS. 4A and 4B may be implemented using the graphics system of FIG. 2A or 2B and may also interact with the software architecture of FIG. 3. For example, the pipeline of FIGS. 4A and 4B may be implemented as software executing on the CPU and/or GPU processes. Note that the GPU may execute various software on the GPU to perform portions of the graphics pipeline and/or may include dedicated hardware for performing those portions, as desired.

In the graphics pipeline of FIG. 4A, the pipeline may begin with vertex data in 402. The vertex data may specify the vertices of the graphics data to be rendered. In one embodiment, the vertex data may include data about polygons with vertices, edges and faces that constitute an entire scene.

In 404, the vertex data of 402 may be processed by a vertex shader. More particularly, the vertex shader may be run for each vertex, e.g., by the GPU. This process may transform each vertex's 3D position in virtual space to the 2D coordinate at which it will appear on the display. The vertex shader may manipulate various properties, including position, color, texture coordinate, etc. As shown, the vertex shader 404 may be informed by texture data 416 and/or shader uniform data 418.

In 406, primitives may be assembled from the vertices output from 404. For example, in this stage vertices may be collected and converted into geometric shapes, e.g., triangles.

In 408, the primitives may be used in rasterization. More particularly, the primitives from 406 may be filled with pixels or fragments.

In 410, the fragment shader (e.g., executed by the GPU) may add textures and final colors to the fragments. Fragment shaders may typically take into account scene lighting and related effects, such as bump mapping and color toning. As shown, the fragment shader may be informed by texture data 416 and shader uniform data 418.

In 412, various per-fragment operations may be performed. For example, the operations may combine the final fragment color, its coverage, and/or degree of transparency with the existing data stored at the associated 2D location in the frame buffer to produce the final color for the pixel to be stored at that location.

In 414, the data may be stored in physical memory which holds the actual pixel values displayed on the screen. The frame buffer memory may also store graphics commands, textures, and/or other attributes associated with each pixel. This data may be used to output the final image to the display.

FIG. 4B illustrates an abbreviated pipeline that may be more appropriate for embedded systems. As shown, is the pipeline includes vertex data 402, per-vertex operations 454 (similar to vertex shader 404), primitive assembly 406, rasterization 408, per-fragment operation 412, and frame buffer 414. This pipeline does not utilize the fragment shader 410 or the shader uniform data 418. Additionally, the texture data is only utilized by rasterization 408 rather than by shaders, as in FIG. 4A.

Thus, FIGS. 4A and 4B illustrate exemplary graphics pipelines that may be utilized in embodiments described herein. However, other, different graphics pipelines are envisioned.

Figure 5:
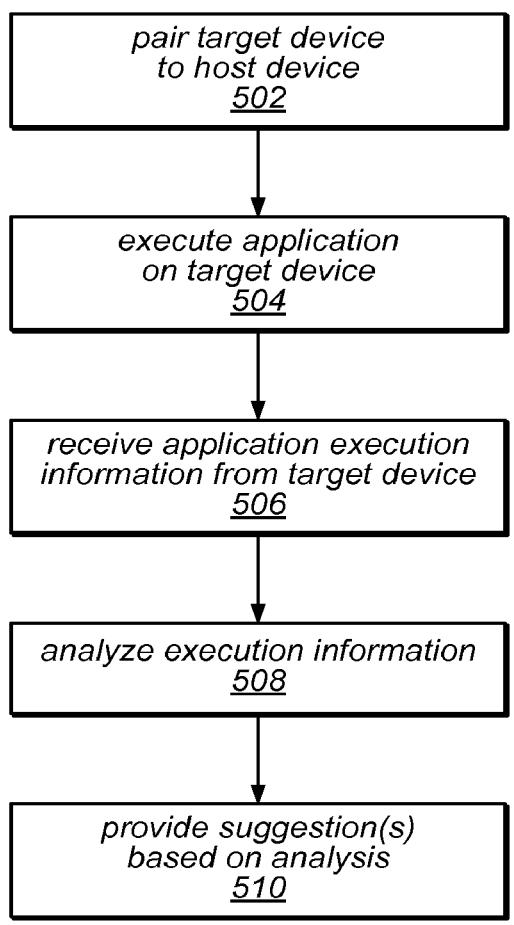
FIG. 5 is a flowchart diagram illustrating one embodiment of a method for analyzing execution of an application on a target device.

FIG. 5—Analyzing Execution of an Application on a Target Device

FIG. 5 illustrates a method for analyzing an application executing on a target device. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a target device may be coupled (or paired) to a host device. As indicated above, the target device and host device may be coupled together in a variety of ways, e.g., directly via a wired or wireless connection, or indirectly, over a network (e.g., an Intranet or the Internet).

In 504, an application may be executed on the target device. For example, the application may be developed using a development environment program executed by the host device. The user (e.g., the developer) may compile the application for execution and/or deploy the application to the target device. As indicated above, the development environment program may also deploy other programs to the target device, e.g., measurement programs, playback programs, etc.

Once deployed on the target device, the development environment program may initiate execution of the application (and/or any other programs, such as those described above) on the target device, e.g., by sending an execution command to the target device. Thus, in 504, the application may be executed by the target device.

In 506, during or after the execution of the application, the target device may provide application execution information to the host device. The application execution information may be any of a variety of information. For example, the application execution information may include information gathered by a measurement application executing on the target device while the application is executing. For example, the measurement application may gather CPU load information, GPU load information, and/or other information. In further embodiments, the measurement application may intercept and record graphics commands provided by the application. The application execution information may include those graphics commands (e.g., encoded in a bitstream). As described in FIGS. 6 and 7 below, the application execution information may be gathered in response to input from the host device, e.g., in response to explicit user input, or may be gathered automatically based on various detected conditions or "triggers".

In 508, the execution information may be analyzed. For example, the execution information may be analyzed to determine any execution issues or performance bottlenecks of the application. In some embodiments, these issues may be particularly identified in relation to graphics performance. For example, the execution information may be analyzed to determine which portion of the graphics pipeline is causing a performance bottleneck during execution of the application. The execution information may also be analyzed to determine if the CPU or GPU is limiting the graphics performance of the application. More details on this particular CPU/GPU analysis is provided in FIG. 9 below.

In some embodiments, further analysis (e.g., similar to 506 and 508) may be performed repeatedly (as described in FIG. 8 below) in order to identify or determine various performance issues (e.g., graphics bottlenecks) of the application.

Finally, in 510, based on the analysis, suggestions may be provided to increase performance (or remove bottlenecks) of the application. For example, where a particular texture is determined to cause a performance bottleneck in the graphics pipeline, the method may provide a suggestion to use a more compact or compressed version of the texture or even a different texture, e.g., a less complex (e.g., lower resolution) texture. Thus, the suggestions may help a developer create a more streamlined application, particularly with respect to graphics of the application. Note that the suggestions may be specific to increasing performance of the application itself, or may be specific to increasing performance of the application when specifically executing on a particular target device. For example, improvements may not necessarily be required on a high performance system, but may be required when the application is executing on a lower performance system. Additionally, if a particular target device has a lower texture buffer, the suggestions may be specific to improving performance because of that particular texture buffer on the particular target device. Thus, the suggestions may be generic with respect to target devices (but still specific to the application) or target device specific, as desired.

The analysis and provision of suggestions may be performed by the development environment program executing on the host device, or by another application, as desired. More specific methods and examples are provided below.

Figure 6:
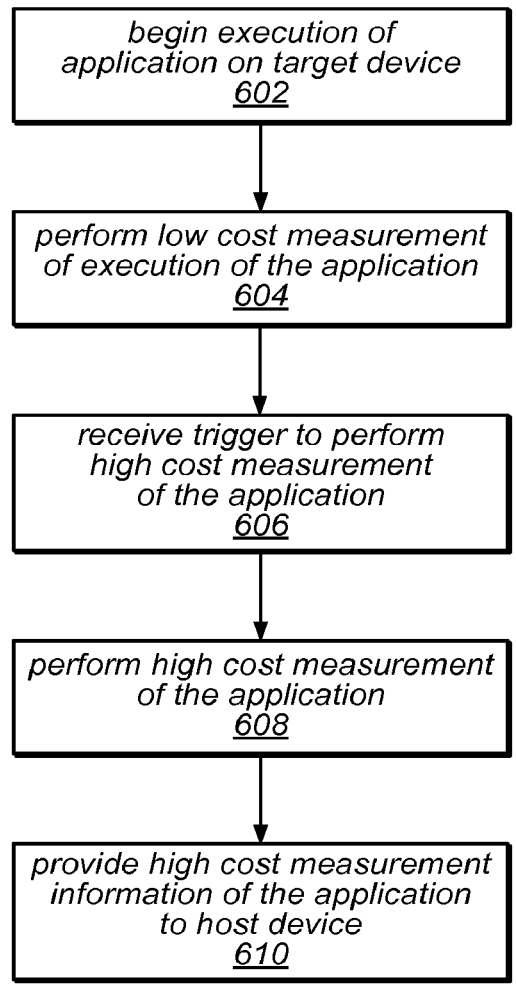
FIG. 6 is a flowchart diagram illustrating one embodiment of a method for switching from low cost monitoring of execution of an application to higher cost monitoring in response to a trigger.

FIG. 6—Triggering High Cost Measurement of an Application Executing on a Device

FIG. 6 illustrates a method for triggering high cost measurement of an application executing on a target device. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, execution of the application by the target device may begin, similar to 504 above.

In 604, low cost (e.g., non-intrusive or less intrusive) measurement of execution of the application may be performed. More particularly, the low cost measurement may measure graphics performance of the application. As indicated above, the low cost measurement may be performed by a measurement application that is deployed (e.g., stored in memory) on the target device. Thus, the measurement program may execute along with the application on the target device and may perform low cost measurement of the application executing on the target device. The low cost measurement may be performed at a level that does not substantially interfere with the execution of the application. For example, in some embodiments, the low cost measurement may not cause a perceptible (by a user) change in graphics performance of the application. In one embodiment, during low cost measurement, the application may execute with at least 90%, 95%, 98%, 99%, etc. of the resources or processing time than it would have had if the low cost measurement were not being performed. In other embodiments, the low cost measurement may cause a perceptible change in graphics performance of the application, but this amount of perceptible change is quite a bit less than the amount of perceptible change caused by the high cost measurement.

In one embodiment, low cost measurement may measure the following parameters: frame rate of the graphics application executing on the target device, percentage CPU utilization (or CPU load), percent of CPU time in graphics framework versus not, percent of CPU time spent waiting for the GPU, percentage of GPU utilization (e.g., average tiler utilization percent and average render utilization percent), GPU power consumption, etc. The low cost measurement may also measure data specifically from the driver. For example, the driver may be configured to record how long it spends in specific sections of the graphics pipeline, e.g., including frame presentation wait time (time spent waiting for the system to present the frame buffer and provide another render buffer), texture upload time (time spent uploading texture data to the GPU), state validation time (time spent validating that the graphics framework state is valid), vertex copy time (time spent converting and copying vertex data to the GPU), etc. These times may be recorded using counters and may be used to determine relative percentages of time spent on these sections of the driver.

In some embodiments, during the low cost measurement, low cost measurement data may be provided from the target device to the host device. The provided low cost measurement data may include all or a portion of the parameters being measured during low cost measurement. Additionally, the low cost measurement data may be provided for display by the host device, e.g., for presentation to a user or developer using the host device.

In 606, a trigger may be received to perform high cost measurement of the application. The trigger may be provided via a variety of mechanisms. For example, in one embodiment, the target device may be coupled to a host device during execution. During execution, the host device may receive input from a user (e.g., the developer) to begin high cost measurement. For example, the user may be monitoring graphics performance of the application on the target device or monitoring provided low cost measurement data. The user may then decide to manually invoke the high cost measurement of the application, e.g., after perceiving a performance issue in graphics performance of the application. Accordingly, the host device may provide a signal to the target device to begin the high cost measurement of the application, thereby triggering the high cost measurement of the execution of the application. In alternate embodiments, the user input may be provided directly to the target device instead of via the host device.

Alternatively, or additionally, the trigger may be detected/provided in an automatic fashion. For example, the device and/or the host may have certain conditions that, when detected during application execution, will initiate the high cost measurement of the application. These conditions may be related to detected performance issues. For example, the conditions may correspond to a graphics performance issue during execution of the application. In one embodiment, the conditions may be based on the parameters being measured by the low cost measurement. For example, the trigger may be a threshold frame rate or a threshold change in frame rate of the graphics of the application on the target device. The trigger may also be based on GPU load, CPU load, CPU graphics load (e.g., CPU load devoted to the graphics driver, framework, or pipeline in general), etc. For example, the trigger may be based on a threshold change (e.g., increase) in one or more of GPU utilization, GPU block utilization (e.g., tiler, rasterizer, etc.), graphics framework CPU utilization (e.g., in general or specific to a particular task, such as vertex copy, state validation, texture upload, etc.), GPU power usage, etc.

The condition may be automatically determined by the host and/or the target device. When determined by the target device, the target device may simply utilize a condition detected by the low cost measurement information to automatically trigger the high cost measurement. When determined by the host device, the target device may continually or periodically provide the low cost measurement information to the host device, which may then analyze that information (e.g., compared to previous measurement information) to detect the condition. Accordingly, upon detection of the triggering condition, the host device may provide an interrupt or other signal to the target device to initiate and perform the high cost measurement of the application.

In one embodiment, rather than capturing all of the low cost measurement data described above throughout execution of the application, only the conditions for triggering may be monitored. Upon reaching a triggering condition (the trigger), a snapshot of the performance of the application may be gathered, including all or a portion of the parameters described above in the low cost measurement portion (e.g., CPU load, GPU load, GPU power, etc.). Once this snapshot has been recorded, the high cost measurement may be triggered as described. By capturing this snapshot, this information may provide a baseline performance of the graphics application for the period of time when the high cost measurement is being performed, since the high cost measurement impacts performance of the execution of the application. In other words, the snapshot may provide the most accurate execution conditions for the period of time that high cost measurement is performed since it is directly preceding that time and the low cost measurement does not significantly impede application execution. Note that this snapshot may also be recorded after completion of the high cost measurement.

Figure 7:
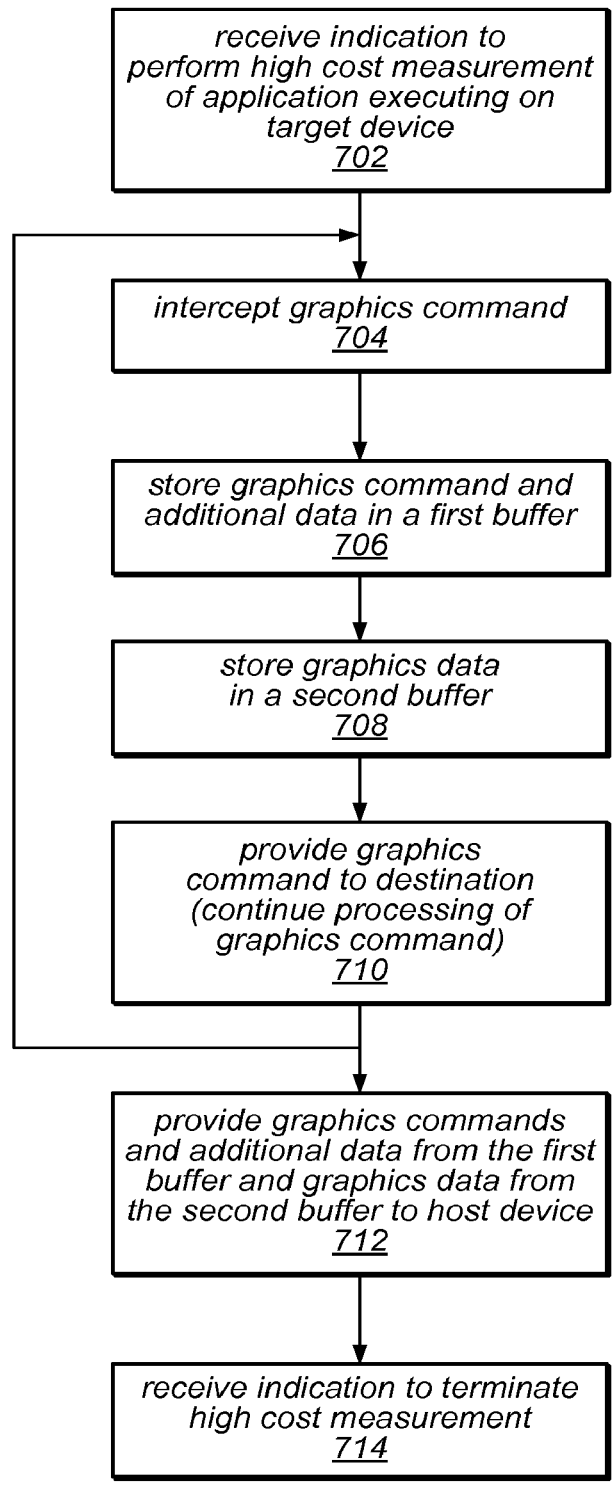
FIG. 7 is a flowchart diagram illustrating one embodiment of a method for capturing a command stream from an application executing on a target device.

In 608, in response to the trigger to begin high cost measurement, high cost measurement (e.g., intrusive measurement) of the application may be performed. Unlike some embodiments of low cost measurement, as indicated above, high cost measurement may typically impact performance of the execution of the application. For example, the high cost measurement may cause a noticeable (by a user) impact to performance of the application. The high cost measurement may be used to allow for more extensive testing of the application. For example, the high cost measurement may continually measure more detailed information of execution of the application (e.g., in a full profile mode). The high cost measurement may also record all graphics commands (e.g., and associated graphics data) for later analysis and playback (e.g., in a record mode). FIG. 7 describes one embodiment of a method for performing high cost measurement of an application executing on a target device. The low cost measurement and high cost measurement may be performed by the same measurement program or different measurement programs, as desired.

In 610, before, during, and/or upon completion of the high cost measurement, measurement information of execution of the application may be provided to the host device, e.g., for further analysis, as in 508 above. The measurement information may include the high cost measurement information and/or the low cost measurement information, as desired. For example, the low cost measurement information may be provided periodically during low cost measurement and the high cost measurement information may be provided periodically during the high cost measurement. Alternatively, the measurement information may be provided after completion of each stage, or after completion of all measurement.

By generally performing low cost measurement, and only performing high cost measurement when certain undesirable conditions are detected, a more accurate performance of the application executing on the target device is measured. Were an intrusive measurement always performed, various problems might arise that are avoided using the method described above. For example, intrusive measurement may not perturb the application evenly across different units or stages of the graphics pipeline, which can disguise a performance bottleneck in one area, e.g., by creating another in a different area. Additionally, since the graphics of an application can achieve a maximum frame rate (where graphics improvements become moot), the graphics rate can be quantized by the refresh rate interval. Accordingly, when such perturbation occurs, it may be magnified due to the quantization caused by the refresh rate interval. Thus, by performing low cost measurement to trigger high cost measurement, these potential problems may be avoided.

Note that the method of FIG. 6 may be performed repeatedly throughout execution of the application. For example, low cost monitoring may be reinitiated after the high cost monitoring is terminated, and the high cost monitoring may be retriggered at a later point in execution of the application. This process may continue until the application is terminated. Alternatively, upon completion of the high cost monitoring, the application may be automatically terminated.

FIG. 7—Performing High Cost Measurement of an Application Executing on a Device

FIG. 7 illustrates one embodiment of a method for performing high cost measurement of an application executing on a target device. The method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 702, an indication to perform high cost measurement of an application executing on a target device may be received. For example, the indication may be received as a trigger as described in FIG. 6 above.

In 704, a graphics command may be intercepted. For example, the graphics command may be intercepted by a measurement application (or graphics command capture application) executing on the target device. In one embodiment, the graphics command may be provided from the application and may be intended for reception by a graphics framework. In this embodiment, the graphics command may be an API call from the application to the graphics framework. Accordingly, the measurement application may intercept the command before it is provided to the graphics framework. In one embodiment, the graphics command may be particularly intercepted by an interpose library (e.g., the measurement application or a portion of the measurement application) that may be injected into the application executing on the target device. Accordingly, this library may intercept all graphics framework functions and other platform APIs and gather execution state information of the application and/or target device when graphics commands are issued.

Alternatively, the graphics command may be intercepted between the graphics framework and a graphics driver executing on the target device. In further embodiments, the graphics command may be intercepted between the graphics driver and the GPU, although those commands may be generally referred to as GPU commands rather than graphics commands.

In 706, the graphics command may be stored in a first buffer. The graphics command may be stored in the buffer as originally received, or may be modified. For example, where the graphics command references additional graphics data (e.g., texture data), which is usually done via a pointer to a memory address, the pointer may be modified to reference a file name or different storage path (e.g., via a URI or URL). Further details regarding storage of the graphics data is provided in 708 below. Additionally, the graphics command may be encoded in a different format (e.g., a bitstream) than the original format.

Further, additional data (or additional information) regarding the graphics command (or associated with it) may also be determined and stored in the first buffer. For example, the additional data may be derived from the graphics command and/or from the graphics system (e.g., the state of the graphics system, the GPU load, the CPU load, or any other information). Thus, the additional data may be determined after the graphics command is intercepted and includes new data that was not included in the graphics command originally.

The additional data may be any of a variety of flags or commands. For example, the additional data may include a "no-execute" flag, which may indicate that the graphics command should not be executed (or should be ignored) by any future playback applications, but possibly not for analysis. The additional data may include an "inserted" command and associated flag, which may indicate that the inserted command was generated by the measurement application and should be executed by playback applications, but possibly not processed by other systems (e.g., during analysis). For example, the inserted command may add functionality, such as creating a new surface or other graphics function.

The additional data may include a "no-trace" flag, which may indicate that the command should not be traced, printed, or displayed to the user by any system, but should otherwise be considered for analysis. The additional data may include a "backtrace", e.g., a set of bytes representing the execution state of the application (e.g., of a user-space thread of the target device) at the time the command was being executed. The backtrace may be encoded in a platform independent manner. The additional data may include "trace events", e.g., a set of bytes including a platform independent header followed by a platform dependent structure (e.g., bitstream) encoding various events, state, performance counters or data current at the time the command was being executed. In one embodiment, this could be a bitfield indicating that certain events have occurred in the graphics framework or driver between the time of the previously intercepted command and the current command. Further, the additional data may specify performance data (e.g., graphics performance data) of the application (e.g., framerate, CPU load, GPU load, etc.).

The additional data may include metadata for the command, e.g., a set of bits indicating the nature of the command. In one embodiment, this could be a set of bits indicating if the command is a C function or an Objective-C method. This metadata may also specify an indicator for whether the format is big endian or little endian, bit width or other bit formats, etc. This additional data may be useful in ensuring that the graphics commands are later executable by target devices other than the one from which the commands are being captured (e.g., which may have different bit formats or lengths).

The additional data may also indicate type information, including, for example, core type (e.g., storage characteristics of the data, char, float, double, etc.) and semantic type (e.g., number, constant, symbols, etc.). By storing this typing information, rich tracing may be more easily performed. For example, a value can be converted to a string (e.g., where the value is a constant), which may allow the value to be later printed.

The additional data may also indicate that a particular value (e.g., associated with the graphics command) is a variable. In this embodiment, rather than storing the value, a new variable may be created. Accordingly, when the graphics command is re-executed (e.g., in playback during analysis), the returned value may be different, but may be recognized as a variable, thereby ensuring that the value of that variable is repeatable in later uses (e.g., by later graphics commands) during playback.

The additional data may include a thread ID, e.g., a numerical identifier for the system thread in which the command was executing. The additional data may include a timestamp, e.g., a timestamp relative to a capture clock or timer (e.g., of the measuring application) indicating the time at which the command was executed or captured (e.g., encoded). The additional data may include the amount of time (e.g., in nanoseconds) that the command took to execute. The additional data may include a graphics framework error (e.g., an OpenGL error), which may indicate the current frameworks error (e.g., part of the graphics framework state machine) at the time the command was being executed.

In 708, if the graphics command referenced any graphics data, that graphics data may be stored in a second buffer (although in other embodiments, the data may be stored in the first buffer with the graphics command and additional data). The graphics data may include textures referenced by the graphics command. For example, the graphics command may reference a texture stored in memory, e.g., via pointers pointing to specific memory address(es). Accordingly, the graphics data may be retrieved from the memory and stored in the second buffer. In some embodiments, any graphics data may be stored as individual files in the second buffer with corresponding names. For example, a referenced texture may be stored as a single file per texture. Alternatively, all of the graphics data may be stored in a graphics data file, as desired. As indicated above, the graphics command may be modified when stored in the first buffer to reference the new location or file name of the graphics data, rather than the original pointer to the memory address(es).

In some embodiments, if the graphics data has been previously copied to the second buffer (or previously copied in general), a reference to the graphics data may be stored rather than re-storing the graphics data itself, thereby saving memory space and transfer time. Thus, redundant graphics data may not be duplicated in the second buffer (or for the graphics commands in general).

In 710, the original graphics command may be provided to its destination. In some embodiments, the graphics command may be provided from the measuring application to the destination (e.g., the graphics framework), e.g., in embodiments where the measuring application captured the graphics command and prevented it from being provided to the destination. Where the graphics command was captured between other entities (e.g., between the framework and the driver, it may be provided to the driver. Alternatively, the graphics command may have been originally delivered to the destination, but the measuring application may have copied the command prior to delivery. In this embodiment, 706 and 708 may operate on the copy of the graphics command.

704-710 may be performed one or more times until the first and/or second buffers are full or until the high cost monitoring is completed.

In 712, the multiple, stored graphics commands and associated additional data from the first buffer and the accumulated graphics data from the second buffer may be provided to the host device, e.g., once the buffers are full. In some embodiments, the graphics commands and additional data may be encoded, e.g., as a bit stream. The graphics commands may have been encoded in 706 or may be encoded at the time of transfer to the host device.

The process of 704-712 may be performed multiple times within the high cost measurement. The commands, additional data, and graphics data may be aggregated as a file or directory, which may be used for later testing and analysis, as described in FIG. 8 below. The commands and additional data (and possibly the graphics data) may be aggregated as a command stream. In embodiments where the command stream is encoded, the encoded data may be a bit stream that includes a function identifier and descriptions of the arguments and values. For example, for values that are sensitive to the platform (e.g., pointer size, endian character, etc.), the entire command stream may be marked, such that it can be converted to the appropriate platform for later execution, depending on the target device. Thus, the command stream may be executable for playback on any of various different platforms regardless of the original platform on which it was recorded.

Finally, in 714, an indication to terminate the high cost measurement may be received, e.g., from the host device.

As indicated in the descriptions of FIG. 6, the method of FIG. 7 may be performed a once or multiple times during the execution of the application, as desired.

Figure 8:
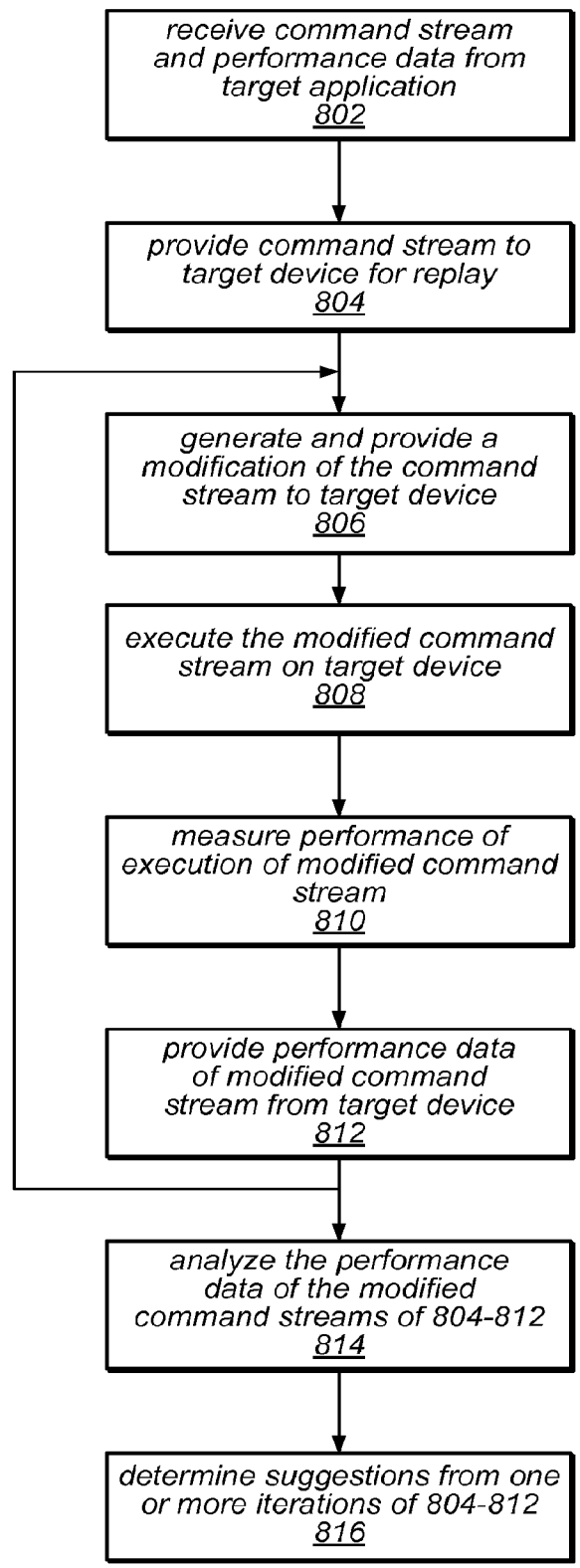
FIG. 8 is a flowchart diagram illustrating one embodiment of a method for determining performance issues of an application executing on a target device.

FIG. 8—Determining Performance Issues of an Application Executing on a Device FIG. 8 illustrates a method for determining performance issues of an application executing on a target device. The method shown in FIG. 8 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 802, a command stream and performance data may be received based on an application executing on a recording target device, e.g., as described in FIGS. 6 and 7 above.

In 804, the command stream may be provided to a target device for replay. The target device may be the same target device that the command stream was originally recorded by, or another target device, as desired. In some embodiments, where the target device is the same as the device which recorded the commands of the command stream, the target device may already have the command stream and may not need to be transferred to the target device for replay.

In one embodiment, rather than using the performance data received from the recording target device executing the application, the command stream may be replayed on the target device to determine a baseline performance of the command stream. Since the command stream may not constitute the whole of the application executing on the target device (because other processes are executed during the application's execution), this baseline performance may be more useful for comparison with executions of modifications to the command stream. Thus, in one embodiment, the command stream may be first executed on the target device and performance may be gathered on that execution of the command stream for comparison to later performance data.

The command stream may be executed in a variety of manners. For example, the command stream may include initial state data that may be used to recreate the initial graphics state of the application when the command stream was initially recorded. Accordingly, the target device may initiate the graphics framework, graphics driver, graphics pipeline, memory mediums, etc. to replicate the initial state when the command stream was recorded. The commands of the command stream may then be executed to generate the performance data. In some embodiments, the commands may simply be executed a single time to generate the performance data.

However, it may be desirable to execute the command stream multiple times to reach a steady state in execution, and then generate performance data of execution of the command stream once that steady state has been reached. In order to execute the command stream multiple times, the command stream may also store final state data that indicates the final graphics state of the application when the command stream was finished recording. This final state information may be used to generate a set of commands to revert the final state to the initial state. Accordingly, the graphics system may be initiated at the initial state, the command stream may be executed, the set of commands to revert the final state to the initial state may be executed, and the process may be repeated until a steady state is reached. As indicated above, once this steady state is reached, the performance data of the command stream may be recorded. This performance data may be based on a single execution of the command stream or may be based on multiple executions of the command stream (e.g., an average or median execution of the command stream). By gathering performance data over multiple executions of the command stream, more accurate performance data may be gathered.

In 806, a modification to the command stream may be generated and provided to the target device. The modification to the command stream may be used to test a particular operation or portion of the graphics pipeline to determine if that operation is causing a performance issue or bottleneck for the application. Stated another way, modifications to the command stream may be made to "try out" different execution scenarios (or experiments) in order to attempt to isolate various "causes" of performance issues. More detailed descriptions regarding the modifications to the command stream to perform testing are provided immediately after descriptions of FIG. 8.

In further embodiments, in order to test a portion of the graphics pipeline, various switches may be modified in the graphics driver to disable parts of the graphics pipeline. For example, color writes may be disabled for the entirety of the command stream or within a portion of the command stream (e.g., within a frame) using graphics driver switches. These switches may be modified in addition to, or potentially instead of, the modification to the command stream. For example, the graphics driver switches may be used to disable one or more portions of the graphics pipeline via initial state data (thereby disabling the portion of the graphics driver for at least the beginning, and potentially throughout the entirety, of the execution of the command stream) or may be set during playback of the modified command stream. In some embodiments, the switches may be set as playback commands within the command stream. Alternatively, or additionally, the switches may be set externally, e.g., as specified within a current test or experiment definition. When set externally, the switches may be enabled or disabled "on the fly" during execution of the modified command stream in 810. In some embodiments, the host may provide instructions to the target device for setting these switches during execution of the modified command stream, e.g., as initial state data, as part of an experiment definition, and/or as part of the modification to the command stream, among other possibilities.

In 808, the target device may modify the command stream (e.g., using the command stream player application) according to the modification to the command stream, to generate a modified command stream.

In some embodiments, rather than providing the command stream and then providing a modification to the command stream, a modified command stream may be generated and provided to the target device. However, modifications to the command stream are generally much smaller than the entirety of the command stream itself, so, when there are multiple tests or modifications to the command stream to perform, it may generally be more efficient to provide the original command stream and subsequent modifications to the command stream. As used herein, provision of one or more modified versions of the command stream may refer to provision of the modified command stream or simply provision of modifications to the command stream that may be used to generate modified command streams.

In 810, the target device may execute the modified command stream and measure the performance of execution of the modified command stream, e.g., using the low cost measurement of the measurement application. The execution of the modified command stream may be performed in a variety of ways, as described above regarding the execution of the original command stream in 804.

In further embodiments, rather than modifying the command stream and separately executing the modified command stream (as in 808 and 810 above), the original command stream may be modified "dynamically" or "on the fly" using the modification to the command stream. However, even in this embodiment, the target device is still executing the modified command stream, but simply has not created an entire new modified command stream from the original command stream. Thus, rather than creating a modified command stream, the original command stream may be dynamically modified during execution using the modification received in 806.

In 812, the performance data of the modified command stream may be provided from the target device.

806-812 may be performed multiple times to perform different tests to determine suggestions for overcoming performance issues of the application on the target device (e.g., to improve graphics performance).

In 814, the performance data may be analyzed. More particularly, the performance data between the different modifications may be compared to determine where there are performance issues or bottlenecks. For example, in one embodiment, the frame rates of each modified command stream may be compared to determine relative increases or decreases between each different modification. From this information relative information can be identified among the different modifications to determine where the performance issues are located (e.g., in the graphics pipeline, or at lower levels, as desired). In one embodiment, the analysis may yield a cost per command or statement in the command stream or even within a shader, which may be utilized to determine the bottleneck(s) of the application executing on the target application via the modifications to the command stream.

In some embodiments, the results of the analysis may be provided for display to the user, e.g., the developer, on the host device. For example, where a particular stage of the graphics pipeline has been identified as causing a performance bottleneck for the application, this information may be provided to the user. In one embodiment, a graphics pipeline image may be displayed which highlights the portions of the pipeline that are causing a performance issue (e.g., as a heat map). Where particular operations or shaders are causing performance issues, these may be identified to the user as well.

In 816, based on the analysis, one or more suggestions may be provided. For example, the suggestions may be provided to the user on the host device, e.g., in the development application executing on the host device. The suggestions may be provided to the user in graphical or textual manners, as desired. Exemplary suggestions and methods for providing that information are provided in the section below as well as in the descriptions of FIGS. 10A-10E.

Exemplary Command Stream Modifications and Suggestions

The modifications to the command stream may be performed to create tests used to isolate any performance issues or bottlenecks in the application. In general, the tests may be initially used to isolate the problem at higher levels all the way down to per operation, per command, or per texture issues. Correspondingly, the initial tests may identify a particular stage in the graphics pipeline that is causing the performance issue. From there, that stage may be further analyzed (e.g., through analysis of more particular modifications to the command stream) to determine which specific operation, command, or texture within that stage is causing the performance issue. Once the issue(s) are particularly identified, one or more suggestions may be provided to the user in order to overcome the identified issue(s).

In one embodiment, these modifications may be performed on a per operation basis and may disable various fragment processing, disable complex texture filtering (e.g., by using a less costly filtering mode when sampling from a texture, such as blinear filtering instead of anisotropic filtering), disable texture compression, use a smaller mipmap, reduce vertex information complexity, etc. In general, the experiments may modify one or more of the following to determine a graphics bottleneck (e.g., after a stage has been identified as being problematic): a shader, a resource (e.g., textures, buffers, vertex data, index data, etc.), or a graphics (e.g., framework) state (e.g., texture filtering, alpha test state, depth test state). Thus, a shader (e.g., a vertex shader or fragment shader) may be replaced with a simpler shader (or nonexistent shader (identity version) to remove the shader's effect), a resource may be replaced with a simpler resource or removed, and the state may be changed to a less intensive state, as some examples. Additionally, the modifications may add or remove different commands from the command stream, as desired.

Based on these experiments, specific and tangible optimization (or improvement) advice may be provided. For example, if the bottleneck is determined to be bound by the GPU performing texture lookup, the suggestions may include:

Use compressed texture formats such as PVRTC2 and PVRTC4 whenever possible.

If can't use compressed textures, minimize texel size.

Use mipmapping whenever possible.

If the analysis determines that particular textures are responsible for this then the suggestions may specifically advise these optimizations for the identified textures.

The following provides an overview of different modifications or experiments that may be performed:

The present render buffer may be disabled, which may be performed on a per frame basis. Rendering in general may be disabled, which may be performed on a per frame or per draw basis. Color writes may be disabled on a per frame or per draw basis. Depth writes may be disabled on a per frame or per draw basis. Stencil writes may be disabled on a per frame or per draw basis. Color masks may be overridden on a per frame or per draw basis. Rasterization may be disabled on a per frame or per draw basis. A minimal viewpoint may be used on a per frame or per draw basis. Cheap (or cheapest) texture filtering may be used on a per frame, per draw, or per texture basis. Small textures may be used on a per frame, per draw, or per texture basis. Compressed textures may be used on a per frame, per draw, or per texture basis. Texture uploads may be disabled on a per frame, per draw, or per texture basis. Minimal vertex shaders (e.g., for OpenGL ES 2.0) may be used on a per frame, per draw, or per shader basis. Minimal fragment shaders (e.g., for OpenGL ES 2.0) may be used on a per frame, per draw, or per shader basis. Alpha testings (e.g., for OpenGL ES 1.1) may be disabled on a per frame or per draw basis. Fragment discards (e.g., for OpenGL ES 2.0) may be disabled on a per frame, per draw, or per shader basis. Lighting (e.g., for OpenGL ES 1.1) may be disabled on a per frame or per draw basis. Matrix palette (e.g., for OpenGL ES 1.1) may be disabled on a per frame or per draw basis. Vertex fetching may be disabled on a per frame or per draw basis. Tiling may be disabled on a per frame or per draw basis. Interleaved vertex data may be forced on a per frame, per draw, or per vertex buffer basis. Optimal vertex format may be forced on a per frame per draw, or per vertex buffer basis. Indexed drawing may be forced on a per frame, per draw, or per vertex buffer basis. Vertex buffer usage may be forced on a per frame or per draw basis. Index buffer usage may be forced on a per frame or per draw basis. Redundant calls may be removed on a per frame basis.

The following provides one embodiment a more detailed account of different experiments that may be performed to isolate performance issues of an application executing on a target device.

The following section describes exemplary overrides. Note that "->" means "replaced with".

OverrideDisablePresent: presentRenderBuffer->glFlush (Except: ->glFinish on last frame of repeat set)

OverrideDisableColorWrites: Driver pipeline control: StageSkipColorWriteOut

OverrideTextureFiltering:
  if minFilter=NEAREST or LINEAR
    minFilter=NEAREST
  else
    minFilter=NEAREST_MIPMAP_NEAREST
  magFilter=NEAREST OverrideUseSmallTextures(all): For all textures: Override glTexImage2D/glCompressedTexImage2D to load two levels of RGBA byte data (level 0: 2×2, level 1: 1×1) Ignore calls to glTexSubImage2D and glCompressedTexSubImage2D OverrideColorMask: ColorMaskRed/Green/Blue/Alpha=False/False/False/False OverrideDisableRendering (OpenGL ES2.0 Only): Driver pipeline control: StageSkipRender OverrideViewport: viewport=(−40, −40, 0, 0)

OverrideShaderSource:
  glShaderSourceARB for vertex shader:
    source->"{gl_Position=vec4(0.0, 0.0, 0.0, 1.0);}"
  glShaderSourceARB for frag shader:
    source->"{gl_FragColor=vec4(1.0, 1.0, 1.0, 1.0);}"

OverrideDisableAll (OpenGL ES 2.0 Only): Driver pipeline control: SkipAll

OverrideDisableES1VertexShading:
Disable NORMALIZE, RESCALE_NORMAL
Disable LIGHTING
Force TEXTURE_MATRIX to Identity
Disable MATRIX_INDEX_ARRAY_OES, WEIGHT_ARRAY_OES The following describes exemplary experiments that may be performed using the above overrides:

ExperimentDontFetchShadeVertex (OpenGL ES 2.0 Only):
  Active overrides:
    OverrideDisableAll
    OverrideDisablePresent ExperimentDontShadeVertex (OpenGL ES 1.1 Only):
  Active overrides:
    OverrideDisableES1VertexShading
    OverrideViewport
    OverrideDisablePresent ExperimentDontTile:
  Active overrides:
    OverrideViewport
    OverrideDisablePresent ExperimentDontRender (OpenGL ES 2.0 Only):
  Active overrides:
    OverrideDisableRendering
    OverrideDisablePresent ExperimentDontShadeFragment (OpenGL ES 2.0 Only):
  Active overrides:
    OverrideColorMask
    OverrideDisableColorWrites
    OverrideDisablePresent ExperimentUseSmallTextures(all) (Note: param=nil means all):
  Active overrides:
    OverrideUseSmallTextures(all)
    OverrideTextureFiltering
    OverrideDisableColorWrites
    OverrideDisablePresent ExperimentAllSimpleTextureFilter
  Active overrides:
    OverrideTextureFiltering
    OverrideDisableColorWrites
    OverrideDisablePresent ExperimentDontWriteColor
  Active overrides:
    OverrideDisableColorWrites
    OverrideDisablePresent ExperimentDontPresent
  Active overrides:
    OverrideDisablePresent The following provides exemplary experiments for the pipeline of GPUs with fragment shader capabilities that may apply to both OpenGL ES1 and OpenGL ES2 applications:
  ExperimentDontFetchShadeVertex
  ExperimentDontTile
  ExperimentDontRender
  ExperimentUseSmallTextures(all)
  ExperimentAllSimpleTextureFilter
  ExperimentDontShadeFragment
  ExperimentDontWriteColor
  ExperimentDontPresent
  ExperimentDontFetchShadeVertex
  ExperimentDontTile
  ExperimentDontRender
  ExperimentUseSmallTextures(all)
  ExperimentAllSimpleTextureFilter
  ExperimentDontWriteColor
  ExperimentDontPresent The following provides exemplary experiments for the pipeline of GPUs without fragment shader capabilities:
  ExperimentDontFetchVertex
  ExperimentDontShadeVertex
  ExperimentDontTile ExperimentUseSmallTextures(all)
ExperimentSimpleTextureFilter
ExperimentAllSimpleTextureFilter:
ExperimentDontWriteColor:
ExperimentDontPresent By performing the various experiments above, more detailed information regarding the specific resources, shaders, or states that are causing the performance issues may be gathered. Additionally, specific suggestions for overcoming these issues may be presented to the developer. This provides a much more efficient and helpful system in assisting a developer create an application that makes efficient use of the graphics system, and goes into a level of detail much greater than, for example, simply identifying that the GPU is limiting graphics performance. Thus, the experiments described above may allow a developer to more easily to determine per operation bottlenecks and solutions.

Figure 9:
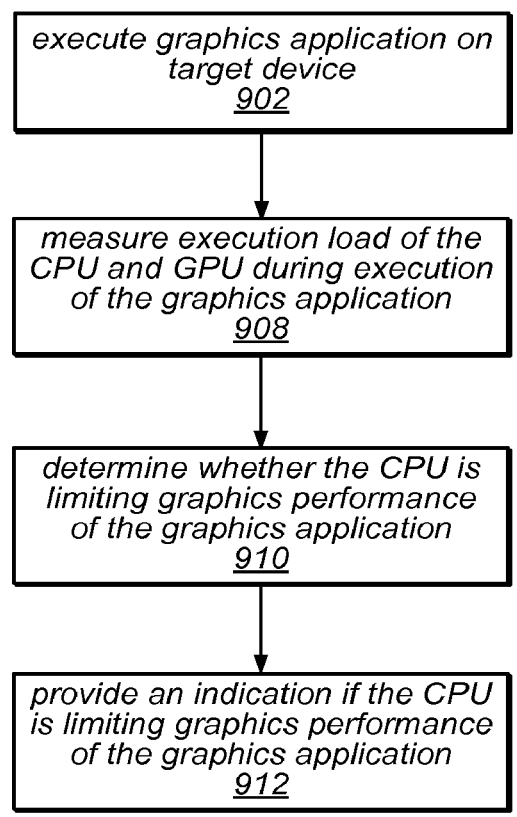
FIG. 9 is a flowchart diagram illustrating one embodiment of a method for determining whether the CPU is limiting graphics performance of an application executing on a target device.

FIG. 9—Determining Whether the CPU is Limiting Graphics Performance

FIG. 9 illustrates a method for determining whether the CPU is limiting performance (e.g., graphics performance) of an application executing on a target device. The method shown in FIG. 9 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 902, a graphics application may be executed on a target device, similar to 504 above.

In 904, during execution of the graphics application, performance information of the CPU and GPU may be measured, e.g., by a measurement application executing on the target device. The measurement application may be performing low cost measurement of the application, as described in FIG. 6 above. However, in further embodiments, this information may be gathered while performing high cost measurement of the application or analysis of the high cost measurement, as described in FIGS. 6-8 above.

In some embodiments, the performance information may include CPU load and GPU load, among other information. The CPU load may be measured in terms of overall CPU load, CPU load while performing graphics operations (e.g., CPU load of the graphics framework and/or graphics driver), and/or CPU load while performing non-graphics operations (e.g., overall CPU load minus the graphics CPU load). The amount of CPU time spent waiting for the GPU or performing graphics related processing may be also measured. Further, the load of the GPU may be measured.

By performing these measurements, the performance cost of an application may be gauged with respect to CPU and GPU. This may also be extended to measure the CPU and GPU cost of specific graphics commands (e.g., using the method of FIG. 8). For example, a particular graphics command may provide a vertex array in a format that is not accepted by the GPU. The CPU may accordingly have to convert the vertex array from the original format to the GPU accepted format (a graphics related process) and provide that converted vertex array to the GPU to perform a draw operation. The performance information may include, for example, the duration, start time, and end time of that graphics related operation, and/or a sum of those durations for all graphics related operations (e.g., by the CPU). Thus, the original graphics command will have a performance cost in terms of both CPU and GPU, and the overall application performance may be bound by the CPU's conversion, the GPU's draw operation, or neither, depending on the application. Other CPU graphics related processing may include texture upload, state validation, etc., and similar data may be gathered for that processing.

However, the CPU is generally also performing non-graphics related processing, e.g., for the application executing on the target application. Where this processing is particularly intensive, it may be limiting the graphics performance of the application.

Thus, the performance data in 904 may be gathered to determine CPU and GPU costs during execution of an application on a target device.

Accordingly, in 906, based on the performance information, it may be determined whether the CPU is limiting graphics performance of the application. More specifically, it may be determined whether the CPU is limiting graphics performance due to graphics related processing or non-graphics related processing. Where the CPU is limiting graphics performance due to non-graphics related processing, further graphics analysis may no longer be required. In some embodiments, if possible, the method may determine which non-graphics related process is limiting graphics performance (e.g., whether it is execution of the application, a service executed by the target device, another application, etc.).

However, if it is not based on non-graphics related processing (i.e., it is related to graphics processing), it may be determined if the CPU's graphics related processing (e.g., associated with the application) is limiting graphics performance or if it is the GPU that is limiting graphics performance. This may be determined using, for example, the method of FIG. 8.

In 908, an indication may be provided if the CPU is limiting graphics performance of the application. More particularly, the indication may indicate a) if the CPU is limiting graphics performance due to non-graphics related processing, b) if the CPU is limiting graphics performance due to graphics related processing, or c) if the CPU is not limiting graphics performance (in which case, it is most likely that the GPU is limiting graphics performance). The indication may further include an identification of the performance bottleneck that is limiting graphics performance, whether it is CPU or GPU related, etc.

The method of FIG. 9 may be incorporated with the method of FIG. 8. More particularly, this analysis and indication may be performed along as a part of the analysis performed in FIG. 8. For example, where the CPU is limiting graphics performance due to non-graphics processing, the method may stop and the analysis of FIG. 8 may not be performed. However, where the CPU is not limiting graphics performance due to non-graphics processing, the method of FIG. 8 may be performed, including determining whether CPU graphics related processing is causing performance issues for the application executing on the target device.

FIGS. 10A-10E—Exemplary GUIs for Analysis of an Application on a Target Device FIGS. 10A-10E are exemplary screen shots of a program for analyzing execution of an application on a target device.

Figure 10A:
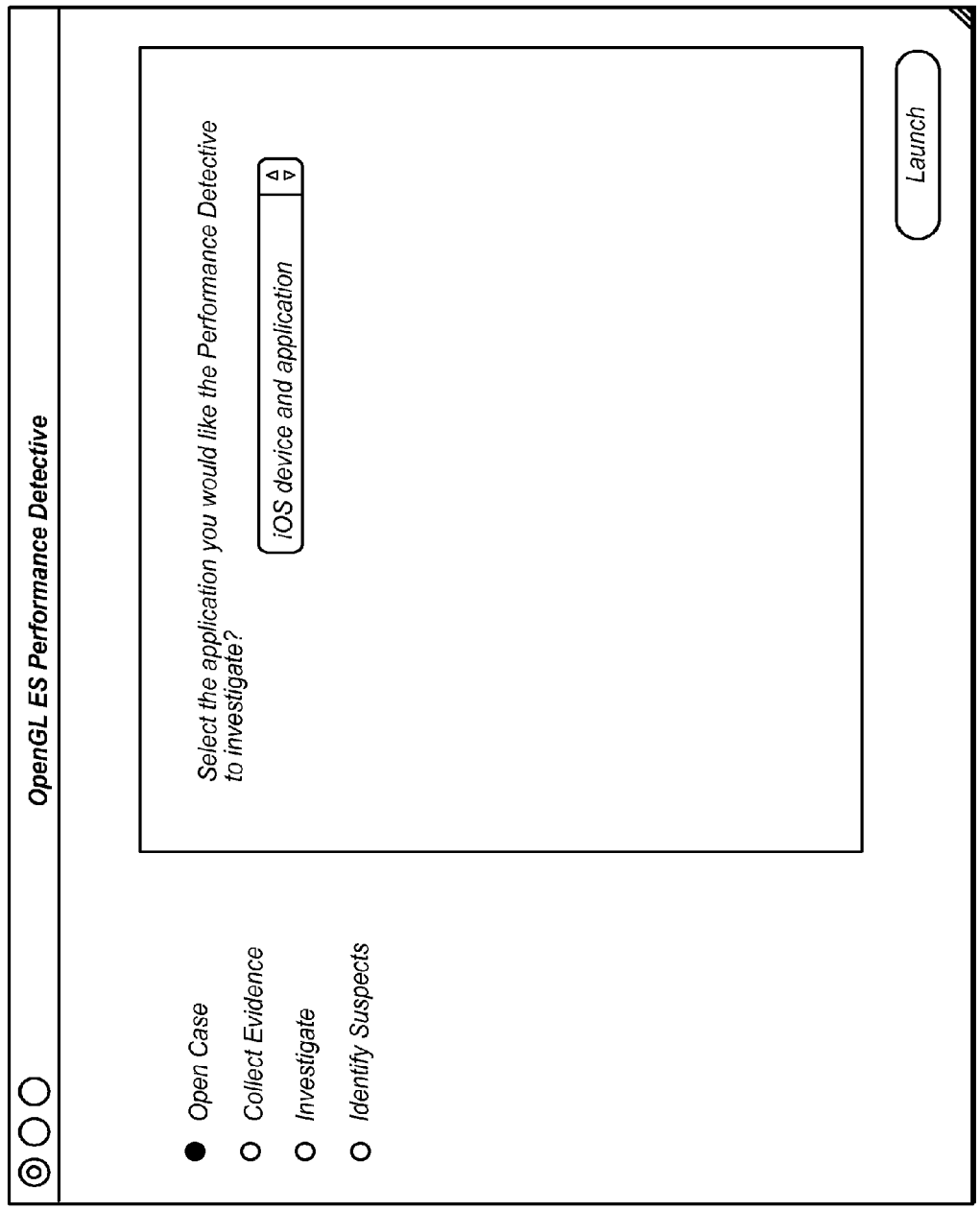

As shown in FIG. 10A, the user may select an application to be investigated. In this particular example, the user (e.g., the application developer) may select "iOS device and application". The user may then launch the performance analysis program using the launch button.

Figure 10B:
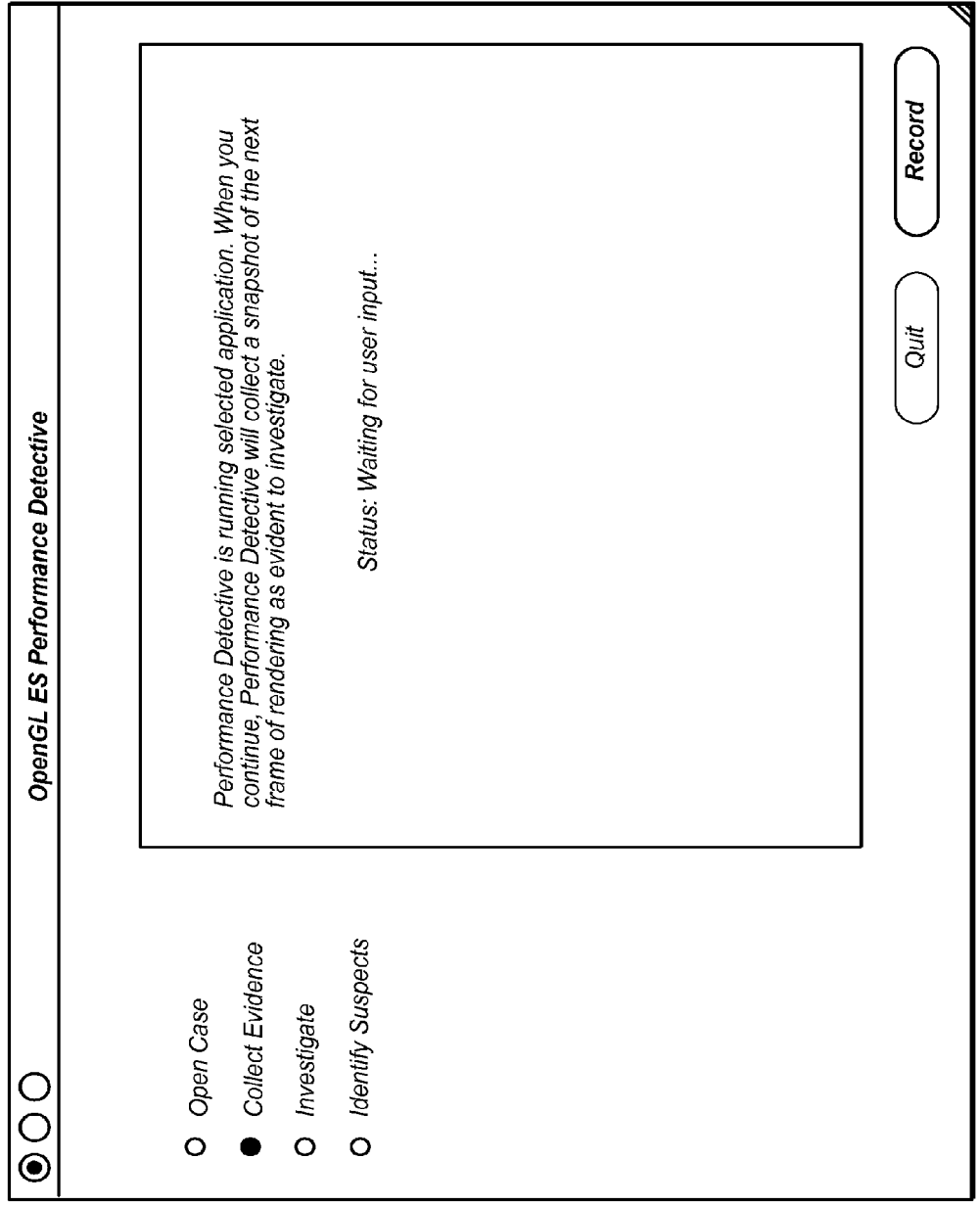

In FIG. 10B, the program may begin collecting evidence. More particularly, at this stage the application may be executed on the target device, and the user may provide input to initiate high cost measurement. Thus, this Figure illustrates an exemplary GUI for initiating high cost measurement, e.g., according to the method of FIG. 6.

Figure 10C:
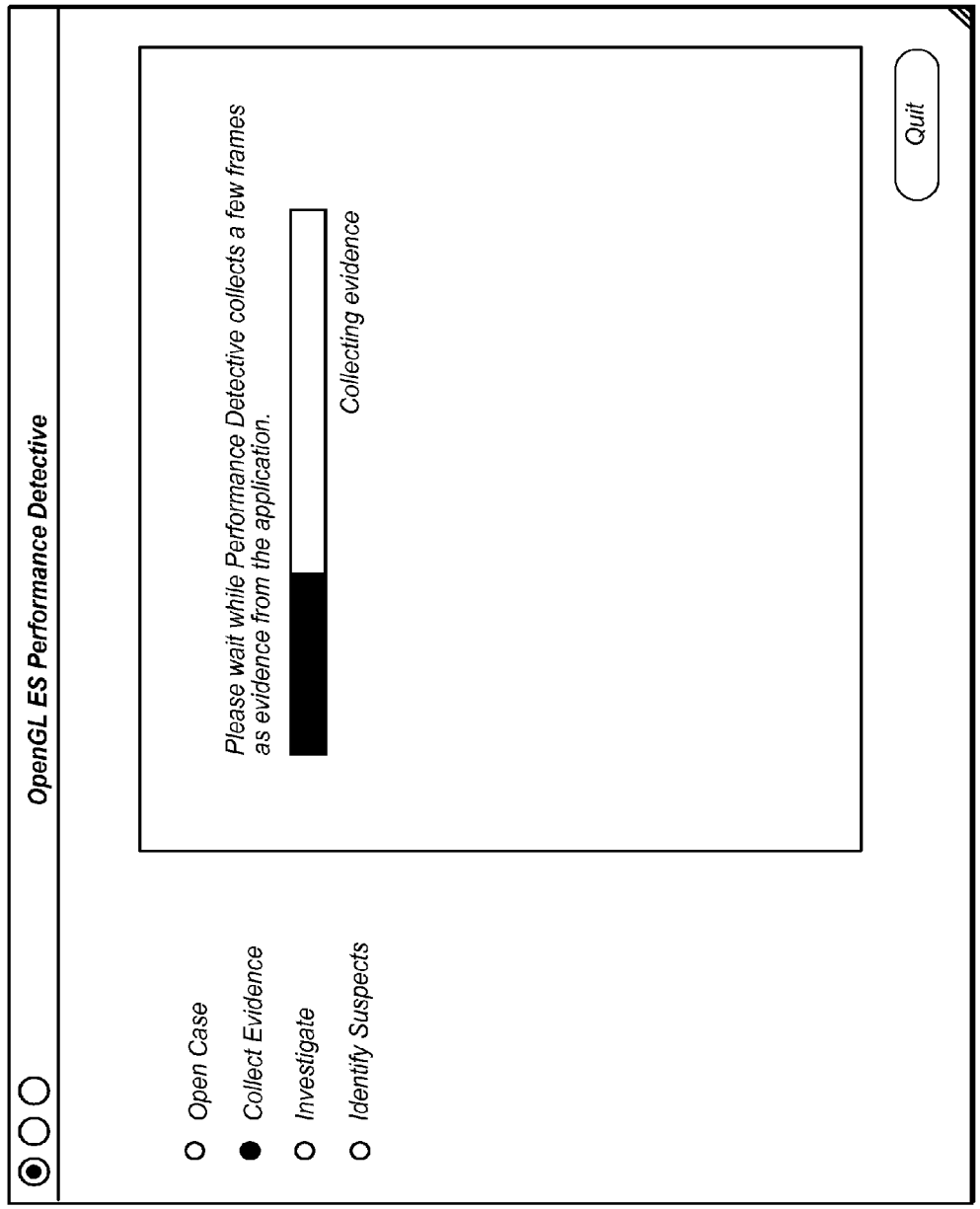

In FIG. 10C, the program may perform high cost measurement, e.g., in response to user input in FIG. 10B (although automatic triggering is also envisioned, as discussed above).

In FIG. 10D, the program may begin analysis and replay using the high cost measurement data, e.g., as described in FIG. 8. As shown in this particular screen shot, the fragment shaders are currently being investigated.

Figure 10E:

Finally, in FIG. 10E, after analysis, the program may provide suggestions for improving graphics performance of the application executing on the target device. In this particular example, the program suggests compressing textures to consume less texture memory and bandwidth. The program also suggests simplifying complex vertex shaders to consume fewer execution cycles. Further, the program suggests culling out vertices that are outside the field of view to avoid wasted GPU effort. The program also provides a graph of potential increased performance after addressing these issues, estimating an increase of 16 frames per second (FPS) for uncompressed textures, 12.5 FPS for simplifying the vertex shader, and 11.5 FPS for culling out of view verticies. The user may then select the "report" button to export a version of this data, which may include further suggestions, performance data, more details, etc.

Thus, FIGS. 10A-10E illustrate exemplary screen shots of a program that analyzes graphics performance of an application executing on a target device.

Further Embodiments

In further embodiments, instead of testing for performance issues or bottlenecks for an application, the command stream and playback may be used to test graphics frameworks or graphics drivers. More particularly, they may be used to compare performance of a new version of the graphics framework or driver against an older version of the graphics framework or driver. For example, a same command stream may be executed according to a first version of the graphics framework and/or driver and then compared to execution according to a second version of the graphics framework and/or driver. Modifications to the command stream may also be used to identify particular differences in performance of the graphics framework and/or driver. Thus, the both general, pipeline, or per operation performance differences in new versions (or modified versions) of the graphics framework and/or driver may be identified using the methods described above.

Additionally, while the above is discussed with respect to graphics pipelines or graphics operations, it may be modified to apply to any type of pipeline or application execution. For example, similar methods may be applied to any computation API or command based applications, such as OpenCL or others.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
  receiving a request to measure performance of an application executing on a target device;
  in response to the request, intercepting a command submitted by the application to a destination;
  storing the command in a first buffer;
  storing a data item referenced by the command in a second buffer as one or more files;
  providing the command to the destination;
  modifying one or more commands stored in the first buffer including the intercepted command, the modifying including changing an original pointer referencing the data item into one or more references to the one or more files; and
  providing the modified one or more commands, and the one or more files, to a host device configured to measure the performance of the application, the host device being different from the destination,
  wherein the method is performed by a computer system including one or more computers.

2. The method of claim 1, wherein:
  the application is a graphics application that issues one or more graphics commands,
  the command includes at least one of the one or more graphics commands,
  the destination is a graphics system including a graphics processing unit (GPU),
  the data item includes graphics data, and
  the host device is a user device configured to present results of measuring the performance.

3. The method of claim 2, wherein intercepting the command is performed by an interpose library that is injected into the application, the interpose library configured to intercept the one or more graphics commands between the application and the graphics system.

4. The method of claim 2, wherein the command is intercepted between a graphics driver of the graphics system and the GPU.

5. The method of claim 2, comprising storing additional information of the graphics command in the first buffer, the additional information including a state of the graphics system derived from the graphics command.

6. The method of claim 2, comprising storing additional information of the graphics command in the first buffer, the additional information including a flag indicating an execution parameter of the graphics command.

7. The method of claim 2, wherein:
  the graphics data is stored in memory at a memory address and is referenced by the graphics command via a pointer pointing to the memory address, and
  the method comprises modifying the pointer upon storing the graphics command in the first buffer and storing the graphics data in the second buffer, the modifying resulting in the pointer pointing to a location of the graphics data in the second buffer.

8. The method of claim 1, wherein the request indicates that measurement of the performance is a measurement designated as a high cost measurement, the high cost measurement comprising a plurality of experiments, wherein in each experiment, the host device modifies a respective parameter of the command.

9. The method of claim 1, wherein providing the one or more command and one or more data items to the host device is triggered by detecting that the first buffer is full or detecting that the second buffer is full.

10. A system comprising:
  one or more computers; and
  a non-transitory computer-readable medium storing instructions operable to cause the one or more computers to perform operations comprising:
    receiving a request to measure performance of an application executing on a target device;

in response to the request, intercepting a command submitted by the application to a destination;
storing the command in a first buffer;
storing a data item referenced by the command in a second buffer as one or more files;
providing the command to the destination;
modifying one or more commands stored in the first buffer including the intercepted command, the modifying including changing an original pointer referencing the data item into one or more references to the one or more files; and
providing the modified one or more commands, and the one or more files, to a host device for measuring the performance of the application, the host device being different from the destination.

11. The system of claim 10, wherein:
the application is a graphics application that issues one or more graphics commands,
the command includes at least one of the one or more graphics commands,
the destination is graphics system including a graphics processing unit (GPU),
the data item includes graphics data, and
the host device is a user device configured to present results of measuring the performance.

12. The system of claim 11, wherein intercepting the command is performed by an interpose library that is injected into the application, the interpose library configured to intercept the one or more graphics commands between the application and the graphics system.

13. The system of claim 11, wherein the command is intercepted between a graphics driver of the graphics system and the GPU.

14. The system of claim 11, wherein:
the graphics data is stored in memory at a memory address and is referenced by the graphics command via a pointer pointing to the memory address, and
the operations comprise modifying the pointer upon storing the graphics command in the first buffer and storing the graphics data in the second buffer, the modifying resulting in the pointer pointing to a location of the graphics data in the second buffer.

15. The system of claim 10, wherein providing the one or more command and one or more data items to the host device is triggered by detecting that the first buffer is full or detecting that the second buffer is full.

16. A non-transitory computer-readable medium storing instructions operable to cause one or more computers to perform operations comprising:

receiving a request to measure performance of an application executing on a target device;
in response to the request, intercepting a command submitted by the application to a destination;
storing the command in a first buffer;
storing a data item referenced by the command in a second buffer as one or more files;
providing the command to the destination;
modifying one or more commands stored in the first buffer including the intercepted command, the modifying including changing an original pointer referencing the data item into one or more references to the one or more files; and
providing the modified one or more commands, and the one or more files, to a host device for measuring the performance of the application, the host device being different from the destination.

17. The non-transitory computer-readable medium of claim 16, wherein:
the application is a graphics application that issues one or more graphics commands,
the command includes at least one of the one or more graphics commands,
the destination is graphics system including a graphics processing unit (GPU),
the data item includes graphics data, and
the host device is a user device configured to present results of measuring the performance.

18. The non-transitory computer-readable medium of claim 17, wherein intercepting the command is performed by an interpose library that is injected into the application, the interpose library configured to intercept the one or more graphics commands between the application and the graphics system.

19. The non-transitory computer-readable medium of claim 17, wherein the command is intercepted between a graphics driver of the graphics system and the GPU.

20. The non-transitory computer-readable medium of claim 17, wherein:
the graphics data is stored in memory at a memory address and is referenced by the graphics command via a pointer pointing to the memory address, and
the operations comprise modifying the pointer upon storing the graphics command in the first buffer and storing the graphics data in the second buffer, the modifying resulting in the pointer pointing to a location of the graphics data in the second buffer.

* * * * *